United States Patent
Sugiyama et al.

(10) Patent No.: US 10,964,323 B2
(45) Date of Patent: Mar. 30, 2021

(54) ACQUISITION METHOD, GENERATION METHOD, SYSTEM THEREFOR AND PROGRAM FOR ENABLING A DIALOG BETWEEN A COMPUTER AND A HUMAN USING NATURAL LANGUAGE

(71) Applicants: NIPPON TELEGRAPH AND TELEPHONE CORPORATION, Chiyoda-ku (JP); OSAKA UNIVERSITY, Suita (JP)

(72) Inventors: Hiroaki Sugiyama, Soraku-gun (JP); Toyomi Meguro, Soraku-gun (JP); Junji Yamato, Soraku-gun (JP); Yuichiro Yoshikawa, Suita (JP); Hiroshi Ishiguro, Suita (JP)

(73) Assignees: NIPPON TELEGRAPH AND TELEPHONE CORPORATION, Chiyoda-ku (JP); OSAKA UNIVERSITY, Suita (JP)

( * ) Notice: Subject to any disclaimer, the term of this patent is extended or adjusted under 35 U.S.C. 154(b) by 112 days.

(21) Appl. No.: 16/301,627

(22) PCT Filed: May 19, 2017

(86) PCT No.: PCT/JP2017/018796
§ 371 (c)(1),
(2) Date: Nov. 14, 2018

(87) PCT Pub. No.: WO2017/200081
PCT Pub. Date: Nov. 23, 2017

(65) Prior Publication Data
US 2019/0295546 A1    Sep. 26, 2019

(30) Foreign Application Priority Data
May 20, 2016 (JP) .............................. JP2016-101228

(51) Int. Cl.
*G10L 15/22* (2006.01)
*G10L 15/18* (2013.01)
(Continued)

(52) U.S. Cl.
CPC ............. *G10L 15/22* (2013.01); *A63H 11/00* (2013.01); *G10L 13/00* (2013.01); *G10L 15/1815* (2013.01); *G10L 2015/223* (2013.01)

(58) Field of Classification Search
CPC ..................................................... G10L 15/22
See application file for complete search history.

(56) References Cited

U.S. PATENT DOCUMENTS 6,584,376 B1 * 6/2003 Van Kommer ...... G05D 1/0022
                                                    379/88.03
7,400,600 B2 * 7/2008 Mullany ............. H04L 12/5692
                                                    370/329
(Continued)

OTHER PUBLICATIONS

International Search Report dated Aug. 8, 2017 in PCT/JP2017/018796 filed May 19, 2017.
(Continued)

*Primary Examiner* — Shaun Roberts
(74) *Attorney, Agent, or Firm* — Oblon, McClelland, Maier & Neustadt, L.L.P.

(57) ABSTRACT

An acquisition method is a method performed by an acquisition system in order to acquire a speech set in which three speeches are associated with one another used to generate a second speech made by a dialog system, based on a speech set in which three speeches are associated with one another, in response to a speech made by a human in response to a first speech made by the dialog system. A storage part of the acquisition system stores a plurality of speech sets in which two speeches are associated with each other and the acquisition method includes a presentation step of presenting in order, a speech t(1) and a speech t(2) which are two (Continued)

consecutive speeches included in a certain speech set stored in the storage part of the acquisition system, a speech receiving step of receiving input of a third speech t(3) which is a human speech after presenting the speech t(2) and a storing step of storing the speech t(1), the speech t(2), and the speech t(3) associated with one another as a speech set in which three speeches are associated with one another in the storage part of the acquisition system.

12 Claims, 11 Drawing Sheets

(51) Int. Cl.
*A63H 11/00* (2006.01)
*G10L 13/00* (2006.01)

(56) References Cited

U.S. PATENT DOCUMENTS

| | | | | |
|---|---|---|---|---|
| 7,640,164 | B2* | 12/2009 | Sasaki | G10L 15/22 463/1 |
| 8,515,764 | B2* | 8/2013 | Nakano | G10L 15/18 704/251 |
| 2002/0178005 | A1* | 11/2002 | Dusan | G06F 40/30 704/254 |
| 2003/0204405 | A1* | 10/2003 | Hanson | G06Q 30/06 709/203 |
| 2004/0030556 | A1* | 2/2004 | Bennett | G06F 40/20 704/270 |
| 2004/0153211 | A1* | 8/2004 | Kamoto | G06N 3/008 700/245 |
| 2006/0047362 | A1* | 3/2006 | Aoyama | G10L 15/22 700/245 |
| 2010/0250241 | A1* | 9/2010 | Iwahashi | G10L 15/22 704/10 |
| 2010/0298976 | A1* | 11/2010 | Sugihara | A63H 11/20 700/248 |
| 2011/0115697 | A1* | 5/2011 | Sakata | G06F 3/011 345/156 |
| 2012/0130716 | A1* | 5/2012 | Kim | G10L 15/07 704/256.1 |
| 2013/0232430 | A1* | 9/2013 | Reitan | G09G 3/003 715/765 |
| 2016/0171387 | A1* | 6/2016 | Suskind | G06N 3/006 706/12 |
| 2017/0193711 | A1* | 7/2017 | Lenchner | G16B 25/00 |
| 2017/0316777 | A1* | 11/2017 | Perez | G06F 40/169 |

OTHER PUBLICATIONS

Ritter, A. et al., "Unsupervised Modeling of Twitter Conversations," Human Language Technologies: The 2010 Annual Conference of the North American Chapter of the ACL, Jun. 2010, pp. 172-180.
Weizenbaum, J., "ELIZA—A Computer Program for the Study of Natural Language Communication Between Man and Machine," Communications of the ACM, vol. 9, No. 1, Jan. 1966, pp. 36-45.

* cited by examiner

ACQUISITION METHOD, GENERATION METHOD, SYSTEM THEREFOR AND PROGRAM FOR ENABLING A DIALOG BETWEEN A COMPUTER AND A HUMAN USING NATURAL LANGUAGE

TECHNICAL FIELD

The present invention relates to a technique for a computer to have a dialog with a human using a natural language, which is applicable to a robot or the like communicating with the human.

BACKGROUND ART

In recent years, research and development on robots communicating with humans has been progressing and put to practical use at various scenes. For example, at the site of communication therapy, there is a usage pattern in which a robot serves as a companion to talk with a person feeling loneliness. More specifically, a robot plays a role of a listener to a resident at elder care facilities, and can thereby heal the loneliness of the resident, and also can show the resident having dialogue with the robot to make chances to start dialogue between the resident and people around the resident such as his/her family and careworkers. In addition, at the site of a communication training, there is a usage pattern in which a robot becomes a training partner. More specifically, the robot becomes a training partner for foreign language learners at a foreign language learning facility, thus helping the foreign language learners to efficiently proceed with foreign language learning. Furthermore, in an application as an information presentation system, robots perform a dialog with each other and have their dialog heard by people as a basis, sometimes talk to people, cause the people to join in dialogue without making the people bored, and can thereby present information in a form easily acceptable to the people. More specifically, when people feel bored at meeting places, bus stops, a platform at a station or the like in a town or when people can afford to participate in a dialog at home or a classroom or the like, it is possible to expect efficient presentation of information such as news, merchandise introduction, introduction of a store of information or knowledge, education (for example, nursery and education of children, education in the liberal arts for adult people, moral enlightenment). Furthermore, in an application as an information collection system, there is a usage pattern in which a robot collects information while talking to people. Since it is possible to maintain a feeling of dialog through communication with the robot, the system can gather information without giving people any feeling of oppression that they are being listened to by a third party. More specifically, the system is expected to be applicable to a personal information survey, a market survey, a merchandise evaluation, a taste investigation for recommended commodity or the like. Thus, a variety of applications are expected from communication between humans and robots, and an implementation of a robot that interacts with users more naturally is expected. With the wide spread of smartphones, chat services such as LINE (registered trademark) are also realized whereby a plurality of users chat with each other substantially in real time, enjoying dialogue among the users. By applying a technique of dialogue between users and robots to this chat service, it is possible to implement a chat service whereby robots can have dialogue with users more naturally even in the absence of any user as a chatting partner.

In the present specification, hardware which becomes a dialog partner of a user such as robots used in these services or chat partner or computer software for causing a computer to function as hardware to become the user's dialog partner are generically called an "agent." Since the agent is intended to become the user's dialog partner, the agent may be personified such as a robot or chat partner, personalized or may possess characters or individuality.

The key to the implementation of these services is a technique that enables the agent implemented by hardware or computer software to perform a dialog with humans naturally.

It is a difficult task to appropriately generate or select a speech of an agent in response to a human speech. As a prior art for generating a speech made by an agent in response to a human speech, a rule-based one is being researched and commercialized (see non-patent literature 1).

PRIOR ART LITERATURE

Non-Patent Literature

Non-patent literature 1: Weizenbaum, Joseph (January 1966), "ELIZA—A Computer Program For the Study of Natural Language Communication Between Man And Machine", Communications of the ACM 9 (1), 1966, pp. 36-45.

SUMMARY OF THE INVENTION

Problems to be Solved by the Invention

However, according to non-patent literature 1, responding to chats where optional topics emerge requires an enormous amount of rules to be manually written, which incurs a significant cost. It is also difficult to secure comprehensiveness and dealing with topics of momentarily changing events requires maintenance to be always performed manually and also has a disadvantage of high running cost.

It is an object of the present invention to provide a generation method that eliminates the necessity for rule writing cost, a method of acquiring data used for the generation method, an apparatus therefor and a program.

Means to Solve the Problems

In order to solve the above-described problems, according to an aspect of the present invention, an acquisition method is a method executed by an acquisition system to acquire a speech set in which three speeches are associated with one another used to generate, based on a speech set in which three speeches are associated with one another, a second speech made by a dialog system in response to a human speech made in response to a first speech made by a dialog system. As the acquisition method, a plurality of speech sets in which two speeches are associated with each other are stored in a storage part of the acquisition system, and the acquisition method comprises a presentation step of presenting in order, a speech t(1) and a speech t(2) which are two consecutive speeches included in a certain speech set stored in the storage part of the acquisition system, a speech receiving step of receiving input of a third speech t(3) which is a human speech after presenting the speech t(2), and a storing step of storing the speech t(1), the speech t(2) and the speech t(3) associated with one another as a speech set in which three speeches are associated with one another in the storage part of the acquisition system.

In order to solve the above-described problems, according to another aspect of the present invention, an acquisition method is a method executed by an acquisition system to acquire a speech set in which N speeches are associated with one another where N is assumed to be any one of an integer equal to or greater than 3 used to generate an N-th speech, based on a speech set in which N speeches are associated with one another, made by a dialog system in response to an (N−1)-th human speech made after first to (N−2)-th speeches made by the dialog system or/and a human. A speech set in which N−1 speeches are associated with one another is stored in a storage part of the acquisition system and the acquisition method comprises a presentation step of presenting in order, a speech t(1) to a speech t(N−1) which are N−1 consecutive speeches included in a certain speech set stored in the storage part of the acquisition system, a speech receiving step of receiving input of an N-th speech t(N) which is a human speech after presenting the speech t(N−1) which is an (N−1)-th speech, and a storing step of storing a speech t(N−$m_p$+1) to the speech t(N) associated with one another for each $m_p$ as a speech set in which $m_p$ speeches are associated with one another in the storage part of the acquisition system, where p is assumed to be an integer equal to or greater than 1 and equal to or less than P and each $m_p$ is assumed to be any one of an integer equal to or greater than 2 and equal to or less than N for each p.

In order to solve the above-described problems, according to a further aspect of the present invention, a generation method is a method for a generation system to generate a speech made by a dialog system in response to a human speech. A speech set in which a first speech presented by an acquisition system, a second speech presented by the acquisition system and a third speech which is a speech of a person a made after presenting the second speech are associated with one another is stored in a storage part of the dialog system, and the generation method comprises a presentation step of presenting a speech t'(1) stored in the storage part of the dialog system, a speech receiving step of receiving input of a second speech t'(2) which is a speech of a person b after presenting the speech t'(1) and a generation step of generating a third speech of a speech set in which a first speech is identical or similar to the speech t'(1) and a second speech is identical or similar to the speech t'(2) of the speech set stored in the storage part of the dialog system as a speech of the dialog system after the speech t'(2).

In order to solve the above-described problems, according to a still further aspect of the present invention, a generation method is a method for a generation system to generate a speech made by a dialog system in response to a human speech. A speech set in which a first speech to an (N−1)-th speech where N is assumed to be any one of an integer equal to or greater than 3 made between a person a and an acquisition system and an N-th speech which is a speech of the person a made after the (N−1)-th speech are associated with one another are stored in a storage part of the dialog system, and the generation method comprises a speech receiving step of receiving input of an m-th speech t'(m) where m is assumed to be any one of an integer equal to or greater than 2 and less than N which is a speech of a person b and a generation step of generating at least a speech t(N−j+1) where j is assumed to be any one of an integer equal to or greater than 1 and equal to or less than N−m, of speeches following the m consecutive speech t(N−m+1−j) to speech t(N−j) of a speech set in which the m consecutive speech t(N−m+1−j) to speech t(N−j) included in the speech set among the speech sets stored in the storage part of the dialog system are identical or similar to the first speech t'(1) to the m-th speech t'(m) made between the person b and the dialog system, as a speech of the dialog system after the speech t'(m).

In order to solve the above-described problems, according to a still further aspect of the present invention, an acquisition system acquires a speech set in which three speeches are associated with one another used to generate a second speech made by a dialog system in response to a human speech made in response to a first speech made by the dialog system based on a speech set in which three speeches are associated with one another. The acquisition system comprises a storage part that stores a plurality of speech sets in which two speeches are associated with each other, a presentation part that presents in order, a speech t(1) and a speech t(2) which are two consecutive speeches included in a certain speech set stored in the storage part, and a speech receiving part that receives input of a third speech t(3) which is a human speech after presenting the speech t(2), and the storage part stores the speech t(1), the speech t(2) and the speech t(3) associated with one another as a speech set in which three speeches are associated with one another.

In order to solve the above-described problems, according to a still further aspect of the present invention, an acquisition system acquires a speech set in which N speeches are associated with one another, where N is assumed to be an integer equal to or greater than 3, used to generate an N-th speech made by a dialog system in response to an (N−1)-th human speech made after first to (N−2)-th speeches made by the dialog system or/and a human based on the speech set in which the N speeches are associated with one another. The acquisition system comprises a storage part that stores a speech set in which N−1 speeches are associated with one another, a presentation part that presents in order, a speech t(1) to a speech t(N−1) which are consecutive N−1 speeches included in a certain speech set stored in the storage part of the acquisition system, and a speech receiving part that receives input of an N-th speech t(N) which is a human speech after presenting the speech t(N−1) which is the (N−1)-th speech, and a speech t(N−$m_p$+1) to the speech t(N) associated with one another are stored for each $m_p$ as a speech set in which $m_p$ speeches are associated with one another in the storage part, where p is assumed to be an integer equal to or greater than 1 and equal to or less than P and each $m_p$ is assumed to be any one of an integer equal to or greater than 2 and equal to or less than N.

In order to solve the above-described problems, according to a still further aspect of the present invention, a generation system generates a speech made by a dialog system in response to a human speech. The generation system comprises a storage part that stores a speech set in which a first speech presented by an acquisition system, a second speech presented by the acquisition system and a third speech which is a speech of a person a made after presenting the second speech are associated with one another, a presentation part that presents a speech t'(1) stored in the storage part of the dialog system, a speech receiving part that receives input of a second speech t'(2) which is a speech of a person b after presenting the speech t'(1) and a generation part that generates a third speech of a speech set in which a first speech is identical or similar to the speech t'(1) and a second speech is identical or similar to the speech t'(2) of the speech set stored in the storage part of the dialog system as a speech of the dialog system after the speech t'(2).

In order to solve the above-described problems, according to a still further aspect of the present invention, a generation system generates a speech made by a dialog system in response to a human speech. The generation system comprises, a storage part that stores a speech set in which a first speech to an (N−1)-th speech made between a person a and an acquisition system where N is assumed to be any one of an integer equal to or greater than 3 and an N-th speech which is a speech of a person a made after the (N−1)-th speech are associated with one another, a speech receiving part that receives input of an m-th speech t'(m) which is a speech of a person b where m is assumed to be any one of an integer equal to or greater than 2 and less than N, a generation part that generates at least a speech t(N−j+1) where j is assumed to be any one of an integer equal to or greater than 1 and equal to or less than N−m, of speeches following the m consecutive speech t(N−m+1−j) to speech t(N−j) of a speech set in which the m consecutive speech t(N−m+1−j) to speech t(N−j) included in the speech set among the speech sets stored in the storage part of the dialog system are identical or similar to the first speech t'(1) to the m-th speech t'(m) made between the person b and the dialog system, as a speech of the dialog system after the speech t'(m).

Effects of the Invention

The present invention exerts an effect of eliminating the need for the rule writing cost.

DETAILED DESCRIPTION OF THE EMBODIMENTS

Figure 1:
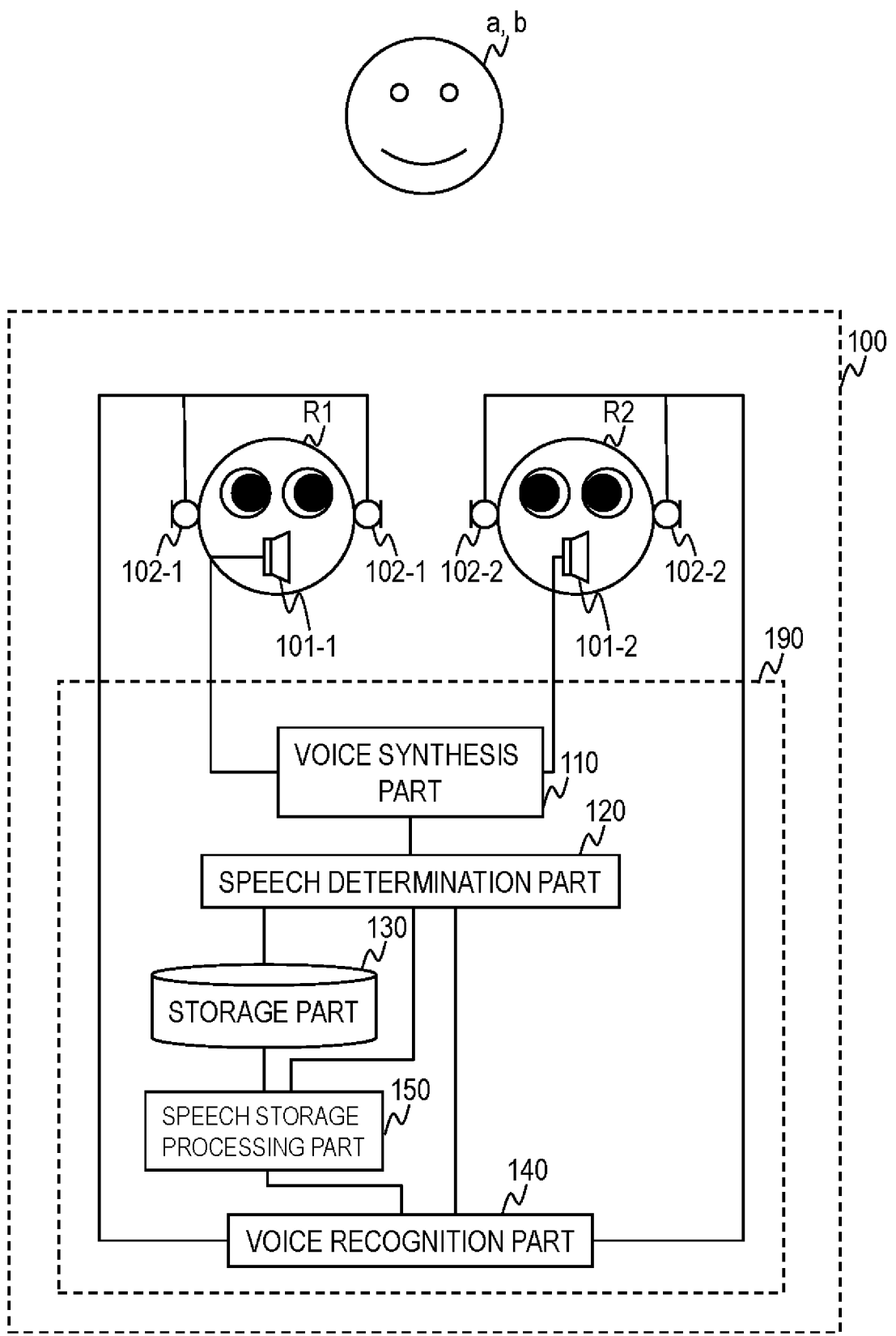
FIG. 1 is a functional block diagram of a dialog system according to a first embodiment.

Hereinafter, embodiments of the present invention will be described. Note that in the drawings used in the following description, components having identical functions or steps in which identical processes are executed are assigned identical reference numerals and overlapping description will be omitted.

Points in First Embodiment

When a human has a dialog with a dialog system, the human has a tendency to utter a speech compatible with a speech level or speech contents of the system. Therefore, a speech made by the human toward the dialog system can be said to be an appropriate speech to be adopted later as a speech of the dialog system. In the present embodiment, by taking advantage of this tendency, speeches made in order of a robot R1, a robot R2 and a person a in a dialog between a dialog system including the robot R1 and the robot R2 and the person are assumed as a three-speech set, and by adding the three-speech set to a database (hereinafter also referred to as "DB"), the dialog system is caused to function as a speech set acquisition system.

In the present embodiment, a robot speech in a dialog between a dialog system including the robot R1 and the robot R2, and a person is generated using the following functions and the dialog system is thereby caused to function as a speech generation system. More specifically, with a robot speech generation function, the robot R1 utters a start (first) speech t'(1) of a certain three-speech set stored in a DB first, and a speech t'(2) made by a person b (person b may be a person identical to the person a or a different person) next to the speech by the robot R1 is received. The dialog system searches for such a three-speech set from among three-speech sets stored in the DB that a first speech of the three-speech set stored in the DB is identical or similar to a speech t'(1) and a second speech of the three-speech set stored in the DB is identical or similar to a speech t'(2). In the dialog system, when the corresponding three-speech set is found, the robot R2 utters the last speech of the three-speech set (a third speech stored in the DB, the speech of the person a of a three-speech set added to the DB or the like).

Two specific examples are shown below. Suppose that speeches are made in order of a speech t(1), a speech t(2), . . . , and in order of a speech t'(1), a speech t'(2), . . . , in the following specific examples.

Specific Example (1)

When system is caused to function as speech acquisition system

Speech t(1): robot R1: Hello!
Speech t(2): robot R2: Hello!
Speech t(3): person a: What a nice weather today!

When system is caused to function as speech generation system

Speech t'(1): robot R1: Hello!
Speech t'(2): person b: Hello!
Speech t'(3): robot R2: What a nice weather today!

Specific Example (2)

When system is caused to function as speech acquisition system
Speech t(1): robot R1: What do you want to eat tonight?
Speech t(2): robot R2: Fried noodles
Speech t(3): person a: Okay! Fried noodles! I also want to eat!

When system is caused to function as speech generation system

Speech t'(1): robot R1: What do you want to eat tonight?
Speech t'(2): person b: I prefer fried noodles (cannot necessarily be completely the same as speech stored in DB)
Speech t'(3): robot R2: Okay! Fried noodles! I also want to eat!

By causing the dialog system to function in this way, it is possible to eliminate the rule writing cost.

Note that a technique of collecting a large volume of human speeches using twitter (registered trademark) or the like and generating a speech based on them (see reference document 1).

(Reference Literature 1) Ritter, A., Cherry, C., and Dolan, B. "Unsupervised Modeling of Twitter Conversations", in Proc. HLT-NAACL, 2010, pp. 172-180

Such a technique can generate a speech without the need for a manual operation about various topics and requires lower cost than rule-based dialog systems. However, since the technique is not manually checked, there is a disadvantage that inappropriate responses can be generated. Furthermore, since speeches of an unspecified large number of people are collected as one DB, there is a problem that it is difficult to keep consistency of characters as the dialog system and appropriate speeches (replies) cannot be generated. Moreover, there is another problem that many dialogs premised on exchange other than exchange on twitter are also included and many inappropriate speeches may also be included in speeches under a situation in which the context thereof is not shared. The present embodiment focuses on one person when acquiring speeches for the DB and can thereby keep consistency of characters. Suppose that a person a when a speech for the DB is acquired is identical to a person b when a speech using the DB is generated. Since the dialog system replies with wordings identical or similar to own wordings (in other words, the dialog system at least never replies with wordings the dialog system would not use), an uncomfortable feeling perceived by people toward the dialog system speech (reply) is lessened compared to prior arts. Note that according to reference document 1, a focus is put on one person as a character from whom speeches are collected, and it is thereby possible to keep consistency of the character. However, since contribution (tweet) is targeted in reference document 1, a large volume of inappropriate speeches can be included as selectable speeches when speeches are generated. On the other hand, in the case of the present embodiment, speeches stored in the DB are based on dialogs with a human and the dialog system, and so many appropriate speeches are included in the DB as selectable speeches when the dialog system generates speeches, which is efficient. Note that in the present embodiment, when the dialog system is caused to function as the acquisition system for speech sets, a plurality of people may have a dialog with the dialog system instead of always focusing on one person who has a dialog with the dialog system. In that case, it is difficult to keep consistency of characters in speech sets acquired and stored in the DB. However, no rule writing cost is necessary and since many appropriate speeches can be included as selectable speeches when speeches are generated, the advantage of high efficiency remains unchanged.

First Embodiment

Figure 2:
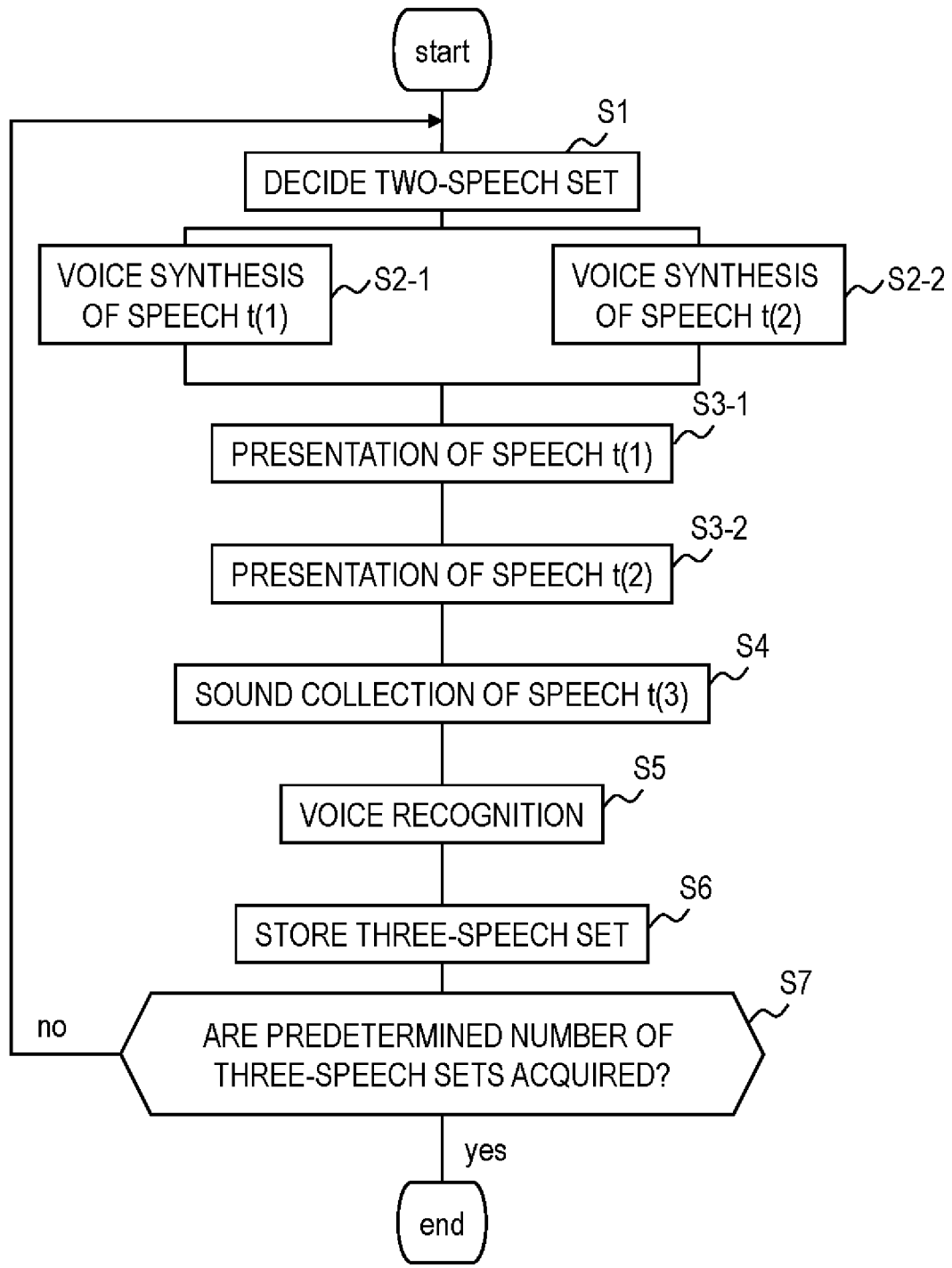
FIG. 2 is a diagram illustrating an example of a processing flow when acquiring data of the dialog system according to the first embodiment.
Figure 3:
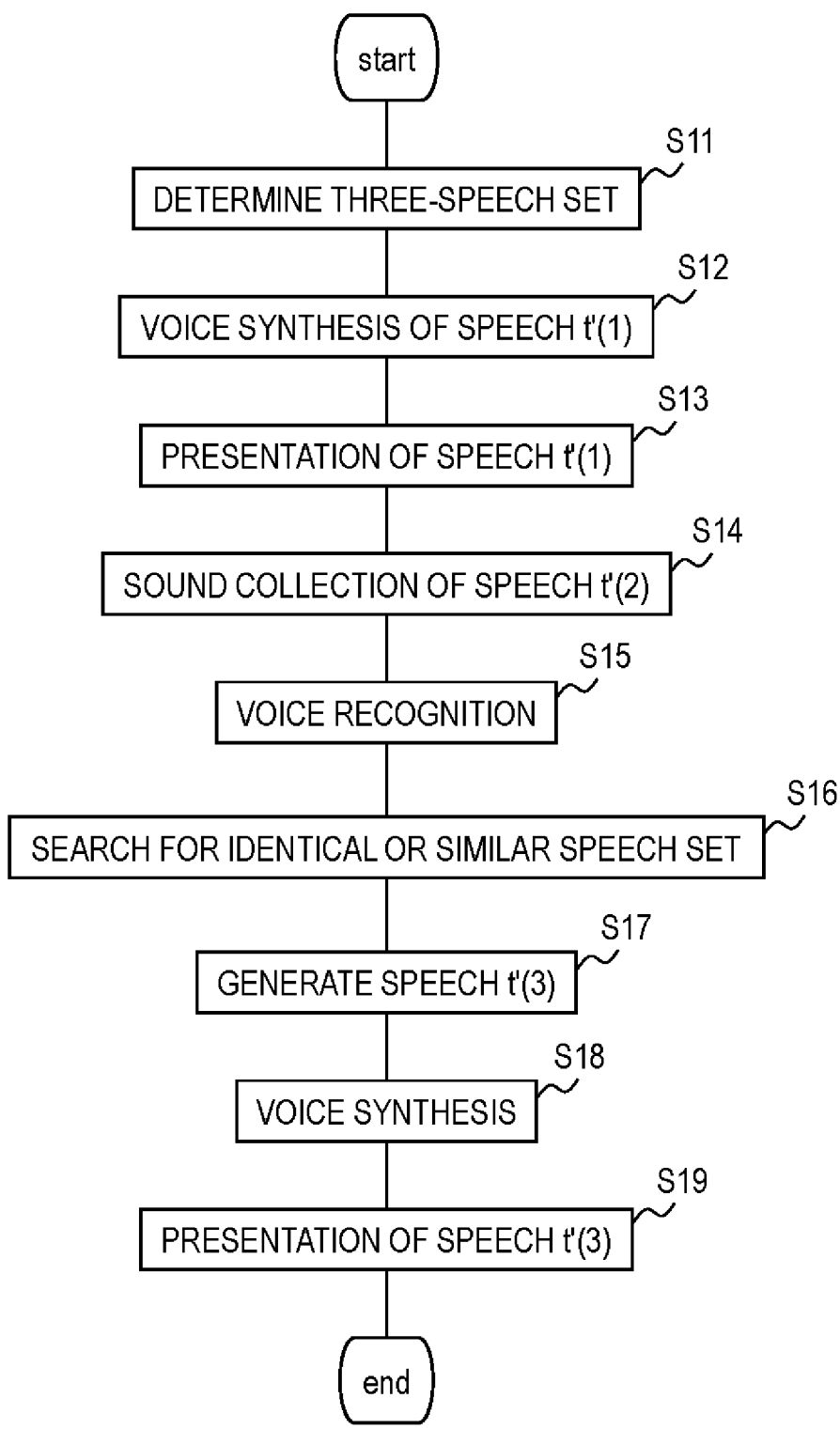
FIG. 3 is a diagram illustrating an example of a processing flow when generating a speech of the dialog system according to the first embodiment.

FIG. 1 illustrates a functional block diagram of a dialog system 100 according to a first embodiment, FIG. 2 illustrates a processing flow when data is acquired and FIG. 3 illustrates a processing flow when a speech is created.

The dialog system 100 includes robots R1 and R2, and a dialog apparatus 190. The dialog apparatus 190 includes a voice synthesis part 110, a speech determination part 120, a storage part 130, a voice recognition part 140 and a speech storage processing part 150. The robot R1 includes a reproduction part 101-1 and a sound collection part 102-1, and the robot R2 includes a reproduction part 101-2 and a sound collection part 102-2. The reproduction parts 101-1 and 101-2 are made up of, for example, speakers and the sound collection parts 102-1 and 102-2 are made up of, for example, microphones.

The dialog system 100 functions as a speech generation system that generates a speech made by the dialog system 100 in response to a human speech. Furthermore, the dialog system 100 functions as a speech acquisition system that acquires data necessary to cause the dialog system 100 to function as a speech generation system. Hereinafter, operation of the dialog system 100 will be described.

<When Acquiring Data (when Dialog System 100 is Caused to Function as Speech Acquisition System)>

Figure 4:
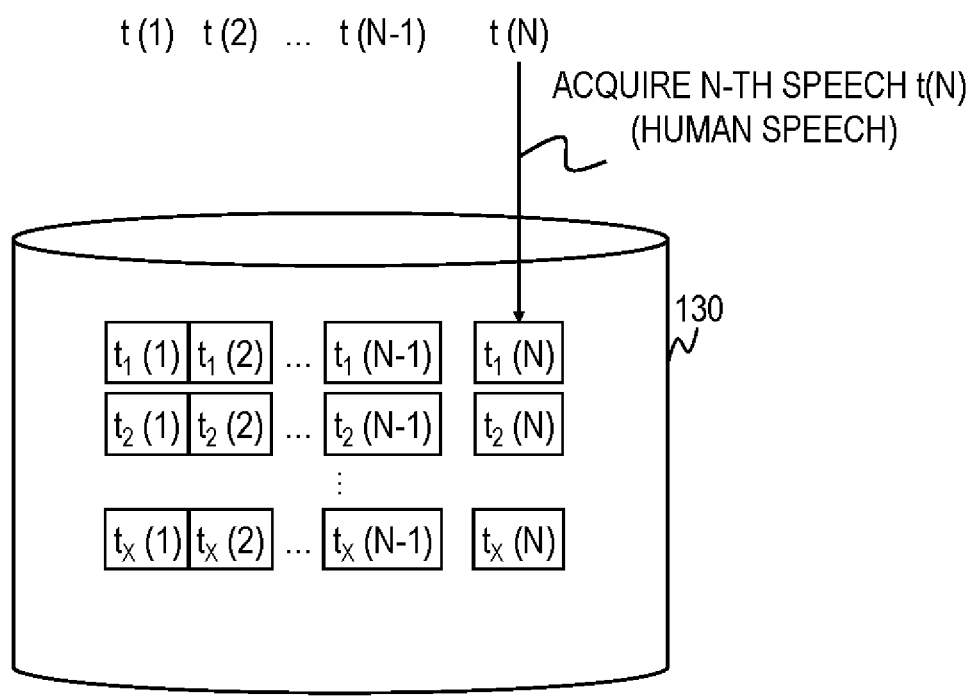
FIG. 4 is a diagram illustrating an example of data stored in a storage part when acquiring data of the dialog system according to the first embodiment.

The storage part 130 stores a combination of two speeches (hereinafter also referred to as a "two-speech set") in a certain dialog in advance. The two-speech set is also referred to as a speech set in which two speeches are associated with each other. Note that according to the present embodiment, the two-speech set is assumed to be stored in a text format, that is, as text data. "Being stored in advance" here means that two-speech set is stored before the data is acquired. FIG. 4 illustrates an example of data stored in the storage part 130. X (N−1)-speech sets (N=3 in the present embodiment) from a first speech $t_x(1)$ to an (N−1)-th speech $t_x(N-1)$ are stored in the storage part 130 in advance. That is, X sets comprising (N−1) speeches from the first speech $t_x(1)$ to the (N−1)-th speech $t_x(N-1)$ are stored in the storage part 130 in advance. The storage part 130 acquires an N-th speech $t_x(N)$ uttered by a human for speeches $t_x(1)$ to $t_x(N-1)$ sequentially made by the dialog system 100 and stores N-speech set which is a set of speeches $t_x(1)$ to $t_x(N-1)$ and the acquired speech $t_x(N)$. Note that a subscript x is an index indicating an N-speech set and x=1, 2, . . . , X.

The speech determination part 120 decides one two-speech set from among a plurality of two-speech sets stored in the storage part 130 (S1) and outputs text data corresponding to the determined two-speech sets to the voice synthesis part 110.

The voice synthesis part 110 performs voice synthesis on the text data corresponding to the first speech t(1) included in the two-speech set t(1) to t(2) (S2-1) and outputs the synthesized voice data to the reproduction part 101-1 of the robot R1. Furthermore, the voice synthesis part 110 performs voice synthesis on the text data corresponding to the second speech t(2) included in the two-speech set t(1) to t(2) (S2-2), and outputs the synthesized voice data to the reproduction part 101-2 of the robot R2.

Each reproduction part reproduces a voice corresponding to the synthesized voice data according to a speech sequence. That is, speeches are presented according to the speech sequence. Note that in the sense that speeches generated by the dialog system 100 are presented to a human, the reproduction part is also referred to as a presentation part. For example, the reproduction part 101-1 presents the first speech t(1) (S3-1). The reproduction part 101-2 presents the second speech t(2) after presenting the speech t(1) (S3-2). In S3-1 and S3-2, the speech t(1) and the speech t(2) which are two consecutive speeches included in a certain speech set stored in the storage part 130 are presented in order.

After presenting the speech t(2), the sound collection part receives input of the speech t(3) made by the person a, that is, collects the speech voice of the speech t(3) made by the person a after presenting the speech t(2) (S4). The sound collection part outputs the collected voice data to the voice recognition part 140. Note that the speech t(3) of the person a is collected by at least one of the sound collection parts 102-1 and 102-2. Since the sound collection part needs only to be able to collect speech voices made by the person a, any one of the sound collection parts 102-1 and 102-2 may not be provided. A configuration without both sound collection parts 102-1 and 102-2 may also be adopted in which a microphone placed at a place different from the robots R1 and R2, for example, in the vicinity of the person a is used as the sound collection part 102. Note that the sound collection part is also referred to as an "input part" in the sense that it is a part through which information is inputted from a human to the dialog system 100.

The voice recognition part 140 performs voice recognition on the collected voice data (S5) and outputs the voice recognition result to the speech storage processing part 150 as text data of the speech t(3).

The speech storage processing part 150 receives the text data of the speech t(3) and associates text data of the speeches t(1) and t(2) which constitute a two-speech set determined by the speech determination part 120 with text data of the speech t(3) outputted from the voice recognition part 140 to form a three-speech set t(1) to t(3) in which three speeches are associated with one another and stores the three-speech set in the storage part 130 (S6).

The dialog system 100 repeats the above-described processes S1 to S6 until acquiring a predetermined number (X in the present embodiment) of three-speech sets (S7). Note that it may be possible to acquire one three-speech set for one two-speech set or acquire two or more three-speech sets (a three-set in which the speech t(1) and the speech t(2) are the same and the speech t(3) is different) for one two-speech set.

Note that according to the aforementioned embodiment, the dialog system utters the speech $t_x(1)$ to $t_x(N-1)$. However, the present invention may take advantage of a feature that it is highly possible that an N-th speech $t_x(N)$ made by the human in response to the speech $t_x(1)$ to $t_x(N-1)$ will be appropriate. For this reason, the dialog system need not always utter the speech $t_x(1)$ to $t_x(N-1)$ as in the case of the aforementioned embodiment. A mode may be adopted in which the human utters a speech of any one of $t_x(1)$ to $t_x(N-1)$. However, one or more speeches of the dialog system need to be included in the speech $t_x(1)$ to $t_x(N-1)$. This is to utilize a human tendency to utter a speech compatible with the speech level and contents of the dialog system when a human has a dialog with the dialog system.

<When Generating Speech (when Dialog System 100 is Caused to Function as Speech Generation System)>

The storage part 130 stores a predetermined number of three-speech sets acquired by causing the dialog system 100 to function as a speech acquisition system, that is, three-speech sets acquired by causing the dialog system 100 to perform the operation described in the aforementioned <when acquiring data (when dialog system 100 is caused to function as speech acquisition system)>. The three-speech set stored in the storage part 130 constitutes a speech set in which a first speech presented by the dialog system 100 when the dialog system 100 is caused to function as a speech acquisition system, a second speech presented by the dialog system 100 and a third speech which is the speech of the person a made after presenting the second speech are associated with one another. Note that in the present embodiment, it is assumed that three-speech sets are stored in a text format, that is, as text data. Here, "stored in advance" means being stored before generating a speech.

The speech determination part 120 determines one three-speech set from among a predetermined number of three-speech sets stored in the storage part 130 (S11). The speech determination part 120 outputs text data corresponding to the first speech included in the determined three-speech sets to the voice synthesis part 110. Here, the first speech is assumed to be a speech t'(1).

The voice synthesis part 110 performs voice synthesis on the text data corresponding to the speech t'(1) outputted from the speech determination part 120 (S12) and outputs the synthesized voice data to the reproduction part 101-1 of the robot R1.

The reproduction part 101-1 reproduces a voice corresponding to the synthesized voice data of the speech t'(1), that is, presents the speech t'(1) (S13).

The sound collection part receives input of the speech t'(2) made by a person b (user b who has a dialog with the dialog system 100) after presenting the speech t'(1), that is, collects a speech voice of the speech t'(2) made by the person b after presenting the speech t'(1) (S14). The sound collection part outputs the collected voice data to the voice recognition part 140. Note that the speech t'(2) of the person b is collected by at least one of the sound collection parts 102-1 and 102-2 and outputted to the voice recognition part 140. Since the sound collection part needs only to be able to collect the speech voice made by the person b, any one of the sound collection parts 102-1 and 102-2 need not be provided. A configuration without both sound collection parts 102-1 and 102-2 may also be adopted in which a microphone placed at a place different from the robots R1 and R2, for example, in the vicinity of the person b is used as the sound collection part 102.

The voice recognition part 140 performs voice recognition on the collected voice data (S15) and outputs the voice recognition result to the speech determination part 120 as text data of the speech t'(2).

Figure 5:
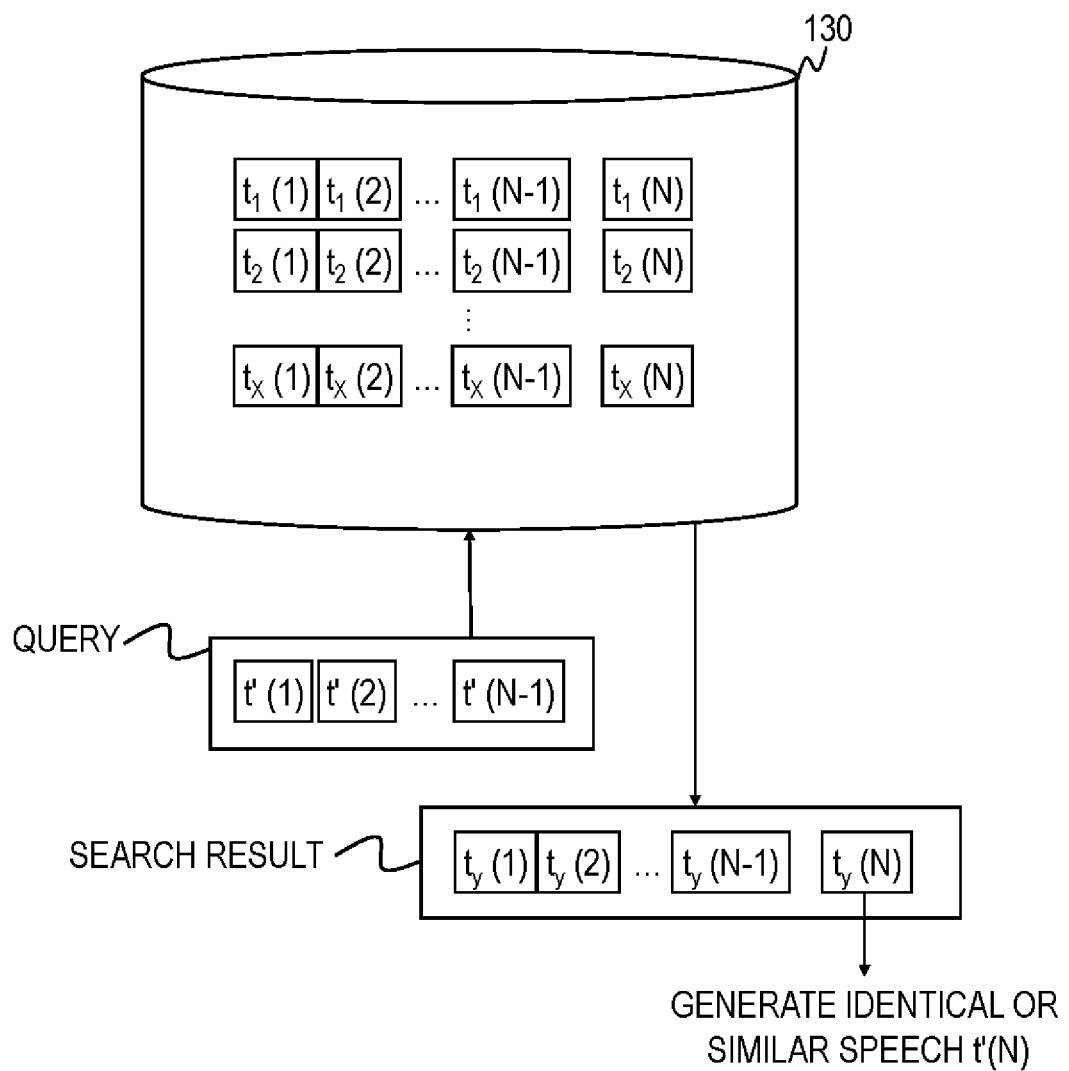
FIG. 5 is a diagram for describing a process when generating a speech of the dialog system according to the first embodiment.

The speech determination part 120 receives the text data of the speech t'(2), searches for three-speech sets t(1) to t(3) in which the speech t(1) is identical or similar to the speech t'(1) and the speech t(2) is identical or similar to the speech t'(2) from among a plurality of three-speech sets stored in the storage part 130. That is, the speech determination part 120 searches for a three-speech set in which text data of the first speech of the three-speech set stored in the storage part 130 is identical or similar to text data of the speech presented by the dialog system 100 immediately before the speech of the person b and in which text data of the second speech is identical or similar to text data of the speech of the person b among the three-speech sets stored in the storage part 130 (S16). The speech determination part 120 calculates, using, for example, the speech t(2) and the speech t'(2) themselves or words in speech sentences, (a) a distance between topic words using word2vec, (b) a distance between sentences obtained by applying word2vec to words of a whole sentence and averaging them and (c) cos similarity or the like among words. The speech determination part 120 judges that the two speeches are identical or similar to each other when the distance is within a predetermined value or the cos similarity is equal to or greater than a predetermined value (in brief, when a predetermined index shows that two speeches are identical or similar to each other). The same judgment applies to the speech t(1) and the speech t'(1). When there is a three-speech set in which the speech t(1) and the speech t'(1), and the speech t(2) and the speech t'(2) are respectively identical or similar to each other, the speech determination part 120 generates text data of a speech identical or similar to the third speech t(3) of the three-speech set as text data of a speech t'(3) presented by the dialog system 100 after the speech t'(2) (S17), and outputs the text data to the voice synthesis part 110. For example, as shown in FIG. 5, the speech determination part 120 generates queries including speeches t'(1) to t'(N−1) (N=3 in the present embodiment) and searches for speeches $t_y(1)$ to $t_y(N-1)$ in which the speeches t'(1) to t'(N−1) are respectively identical or similar to speeches $t_x(1)$ to $t_x(N-1)$ (that is, speech t'(q) is identical or similar to speech $t_x(q)$ for all of q=1, 2, . . . , N−1) from among (N−1)-speech sets $t_x(1)$ to $t_x(N-1)$ corresponding to X N-speech sets $t_x(1)$ to $t_x(N)$ stored in the storage part 130, where y is any one of 1, 2, . . . , X. The speech determination part 120 generates a speech identical or similar to N-th speech $t_y(N)$ of identical or similar speeches $t_y(1)$ to $t_y(N-1)$ as a speech t'(N) of the dialog system 100. As a method of generating text data of a speech identical or similar to the N-th speech t(N), the speech determination part 120 generates a speech t'(N) similar to the speech t(N) using, for example, methods such as (A) changing the ending of a word, (B) paraphrasing a content word (words expressing substantial contents such as a noun, adjective, verb, adverb) (synonymously changing a word difficulty level, paraphrasing with synonyms or the like) and (C) omitting part of the N-th speech t(N).

Note that when there is no three-speech sets including the speech t(1) and the speech t(2) similar to the speech t'(1) and the speech t'(2) in the three-speech sets stored in the storage part 130, the processing performed by the speech determination part 120 is not particularly determined. For example, the speech determination part 120 may generate a speech that does not break the flow of dialogue, for example, nodding or speech meaning confirmation (speech not including new contents). Examples of the speech not including new contents include a speech without content words which are not included in several preceding speeches in a series of the flow of dialogue, in other words, a speech that includes only content words which are included in several preceding speeches, for example, a speech meaning a confirmation such as "I see, ○×Δ" (where ○×Δ is a quotation from the speech t(2)). Certainly, each content word included in a speech not including any new content need not completely match content words included in several preceding speeches, but may be a content word in a synonymous relationship.

Among the three-speech sets stored in the storage part 130, there can be a case where there are a plurality of three-speech sets in which the speech t(1) is identical or similar to the speech t'(1) and the speech t(2) is identical or similar to the speech t'(2). In that case, the speech determination part 120 may select one three-speech set as appropriate. For example, the speech determination part 120 may select a three-speech set with higher similarity or randomly select a three-speech set or randomly select a three-speech set using similarity as a weight.

The voice synthesis part 110 performs voice synthesis on text data of the speech t'(3) inputted from the speech determination part 120 (S18), obtains synthesized voice data and outputs the synthesized voice data obtained to the reproduction part 101-1 of the robot R1.

The reproduction part 101-1 of the robot R1 reproduces a voice corresponding to the synthesized voice data of the speech t'(3) inputted from the voice synthesis part 110, that is, presents the speech t'(3) (S19).

<Effects>

The above configuration can eliminate the need for the rule writing cost when the dialog system 100 is caused to function as a speech acquisition system that acquires data necessary for causing the dialog system 100 to function as a speech generation system. When the dialog system 100 is caused to function as a speech generation system that generates a speech made by the dialog system 100 in response to a human speech, it is possible to generate a speech with less uncomfortable feeling from the data acquired without defining rules. As described above, it is a difficult task to appropriately generate or select a speech of the dialog system for a human speech. However, according to the present embodiment, since the speech t(3) is a speech of a person a made in response to the speeches t(1) and t(2), the speech t'(3) identical or similar to the speech t(3) can be considered at least not as an unnatural speech to the person a. Furthermore, since the speech t(3) is acquired in response to the speeches t(1) and t(2) in the flow of the dialog between a human and the dialog system, when generating a speech carried out by the dialog system in response to the human speech, it is possible to confirm the flow of the dialog between a human and the dialog system using the first speech t'(1) and the second speech t'(2) and generate the third speech t'(3) along the flow. This reduces the possibility that an unnatural speech ignoring the dialog flow may be selected as the third speech t'(3).

<Modification 1>

According to the present embodiment, only text data is stored in the storage part 130, but it is also possible to adopt a configuration in which a combination of text data and voice data corresponding to the text data is stored and the reproduction part 101 reproduces voice data corresponding to text data of the speech determined by the speech determination part 120. In this case, the voice synthesis part 110 can be omitted.

<Modification 2>

The dialog system according to the first embodiment is an information processing apparatus in which two robots operate in cooperation to have a dialog with a human, but it can also be an information processing apparatus in which one robot has a dialog with a human or an information processing apparatus in which three or more robots have a dialog with a human. For example, the same one robot may present the speech t'(1) in S13 and present (S19) the speech t'(3) generated (S17) by the dialog system based on the human speech t'(2) (reply) in S14. In this case, a plurality of robots may perform a dialog with a human from S19 onward in cooperation or the same one robot as the robot up to S19 may perform a dialog with a human. Note that when the number of robots is one, it is unnatural that the robot continuously utters speeches, but that scene may be set as if the robot is talking to itself or as if the robot acts responding to its own speech. If it is possible to judge which robot is engaged in the dialog, the number of reproduction parts (presentation parts) or input parts may be one or two or more.

<Modification 3>

In the present embodiment, the dialog system 100 performs data acquisition processing and speech generation processing, that is, both the function as the speech acquisition system and the function as the speech generation system. However, the respective functions may be constructed of different apparatuses. Alternatively, the dialog system 100 may be configured to perform only one of the function as the speech acquisition system and the function as the speech generation system. In that case, data acquired and stored in the storage part 130 by a system or an apparatus caused to function as the speech acquisition system may be stored in the storage part 130 of a system or an apparatus caused to function as the speech generation system. Note that when the dialog system 100 or the dialog apparatus 190 is caused to function as the speech generation system, the speech storage processing part 150 may not be provided. A portion of the aforementioned dialog system is also referred to as an "acquisition system" which is used to acquire a speech set in which three speeches are associated with one another used to generate a second speech made by the dialog system in response to a human speech made in response to a first speech made by the dialog system based on the speech set in which three speeches are associated with one another. Furthermore, a portion of the aforementioned dialog system is also called a "generation system" which generates a speech made by the dialog system 100 in response to a human speech.

<Modification 4>

An example has been described in the aforementioned embodiment where a dialog is performed with a voice using robots as agents, but the robots of the aforementioned embodiment may be humanoid robots having physical bodies or the like or robots without physical bodies or the like. The dialog technique of the present invention is not limited to those described so far, and it is also possible to adopt a mode in which a dialog is performed using an agent without any physical body or the like or any utterance mechanism like a robot. One such mode may be a mode in which a dialog is performed using an agent displayed on a screen of a computer. More specifically, the present dialog system is applicable to a mode in which a dialog is performed between a user's account and an account of a dialog apparatus in a group chat like "LINE" or "2 Channel" (registered trademarks) where a dialog is performed by a plurality of accounts using text messages. In this mode, the computer having the screen to display the agent needs to be located in the vicinity of a person, but the computer and the dialog apparatus may be connected together via a network such as the Internet. That is, the present dialog system is applicable not only to a dialog in which speakers like a person and a robot engage dialogue face to face, but also to dialogue in which speakers communicate with each other via a network.

Figure 6:
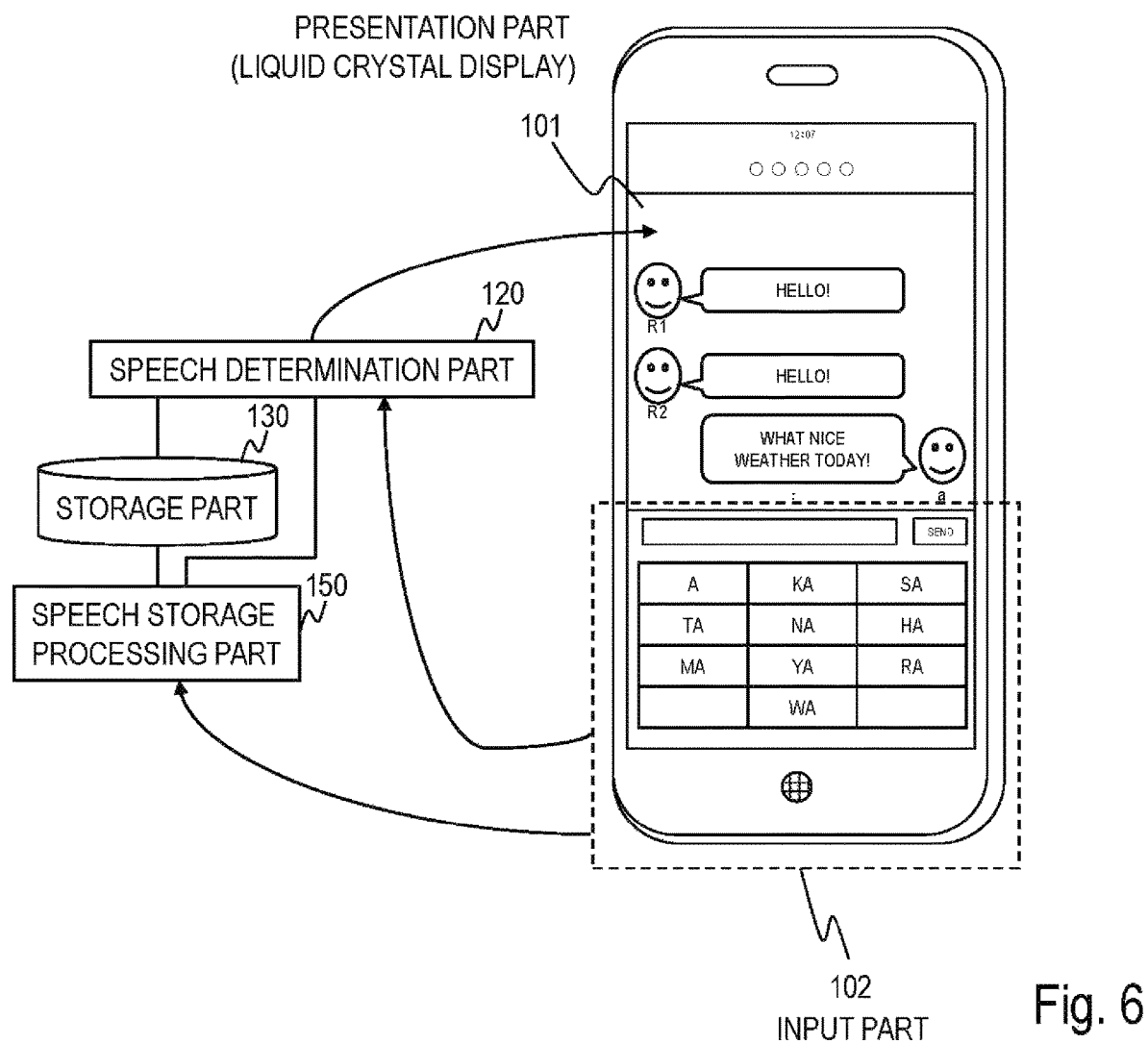
FIG. 6 is a diagram illustrating a modification of a presentation part and an input part of the dialog system according to the first embodiment.

As shown in FIG. 6, the dialog system 100 according to this modification is provided with an input part 102, a speech storage processing part 150, a storage part 130, a speech determination part 120 and a presentation part 101. In the example in FIG. 6, the dialog system 100 according to the modification is constructed of one dialog apparatus 190 and the dialog apparatus 190 according to the modification is provided with the input part 102, the speech storage processing part 150, the storage part 130, the speech determination part 120, and the presentation part 101.

The dialog apparatus according to the modification is an information processing apparatus such as a mobile terminal like a smartphone or tablet or a personal computer like a desk top or lap top. The following description is given assuming that the dialog apparatus is a smartphone. The presentation part 101 is a liquid crystal display provided for the smartphone. A window of chat application is displayed on this liquid crystal display and dialog contents of the group chat are displayed in the window in time-series order. The "group chat" is a function whereby a plurality of accounts in a chat mutually contribute text messages and develop a dialog. Suppose a plurality of virtual accounts corresponding to virtual characters controlled by the dialog apparatus and the user's account participate in this group chat. That is, the present modification is an example of a case where the agent is a virtual account displayed on the liquid crystal display of the smartphone which is the dialog apparatus. The user enters speech contents into the input part 102 using a software keyboard and can contribute to the group chat through the own account. The speech determination part 120 determines speech contents to be carried out by the dialog apparatus according to any one of the functions described in the present embodiment and contributes to the group chat via each virtual account. Note that a configuration may also be adopted in which the user inputs speech contents to the input part 102 by utterance using the microphone and the voice recognition function provided for the smartphone. A configuration may also be adopted in which the user inputs speech contents to the input part 102 in handwriting using the touch panel and the character recognition function provided for the smartphone. A configuration may also be adopted in which speech contents obtained from each dialog system are outputted with a voice corresponding to each virtual account from the speaker, using the speaker and the voice synthesis function provided for the smartphone.

Note that when a plurality of agent speeches are consecutively uttered, if the agent speeches are simultaneously displayed on the presentation part 101 (display), this may be favorably perceived as being engaged actively or heating up, however, on the other hand, when a greater amount of text than the user can read at a time is presented, the user may be likely to consider it difficult to continue the dialog. Therefore, speeches may be sequentially displayed depending on the situation in which the dialog is used in a scene where an acknowledgment load cannot be placed on the user or a scene where a calm atmosphere is required.

Points in Second Embodiment

When a human has a dialog with the dialog system, if speeches in a question and answer style continue, the sense of a natural dialog may be lost. Therefore, the dialog system utters two or more speeches in response to one human speech to realize a natural dialog sense. A method of acquiring data and a method of generating a speech to realize such a natural dialog sense will be described.

First, when the dialog system 100 is caused to function as a speech generation system, a method for the dialog system to utter two or more speeches in response to one human speech will be described. When generating a speech, that is, when the dialog system 100 is caused to function as a speech generation system, the first embodiment has assumed that the second speech t'(2) is a human speech, whereas the present embodiment assumes that the first speech t'(1) is a human speech. In the present embodiment, the speech determination part 120 may judge whether or not the first speech t(1) of the three-speech set among a plurality of three-speech sets stored in the storage part 130 is identical or similar to the speech t'(1) made by the human, generate a speech identical or similar to the second speech t(2) and a speech identical or similar to the third speech t(3) of the three-speech set in which speech t(1) and the speech t'(1) are identical or similar to each other as speeches t'(2) and t'(3) of the dialog system 100. Adopting such a configuration makes it possible to perform two or more speeches in response to one speech and realize a natural dialog sense. However, since the flow of a dialog is confirmed only by the speech t'(1), there is a higher possibility than in the first embodiment that unnatural speeches ignoring the flow of dialog may be selected.

Next, a method will be described in which the dialog system 100 uses a four-speech set, a five-speech set, . . . , and the dialog system utters two or more speeches in response to one human speech. For example, when acquiring data, that is, when the dialog system 100 is caused to function as a speech acquisition system, a robot utters first to third speeches of a three-speech set stored in the storage part 130 and a four-speech set including a speech as a fourth speech made by a human after the third speech is stored in the storage part 130. When generating a speech, that is, when the dialog system 100 is caused to function as a speech generation system, the robot utters the first speech t'(1) and the second speech t'(2) of the four-speech set stored in the storage part 130, and a human utters the speech t'(3) after the second speech. Of the plurality of four-speech sets stored in the storage part 130, it is judged whether or not the first to third speeches t(1) to t(3) of the four-speech set are identical or similar to speeches t'(1) to t'(3) between the robot and the human, and a speech identical or similar to a fourth speech t(4) of the four-speech set in which all speeches are identical or similar is generated as a speech t'(4) of the dialog system 100. As the number of speeches included in a set increases, the possibility that a natural speech can be selected increases. However, even when the number of speeches included in a set is increased too much, the possibility that a natural speech can be selected converges and the number of speeches does not increase so much. As the number of speeches increases, the number of types of combination increases and the volume of data needed to be stored in the storage part 130 becomes enormous. When a balance between the required data volume and the appropriateness of speeches generated is taken into consideration, using three-speech sets according to the first embodiment is considered to be most efficient. However, four-speech set, five-speech set, . . . may also be used depending on the storage capacity of the storage part 130 or the amount of calculation processing of the speech determination part 120.

Second Embodiment

Figure 7:
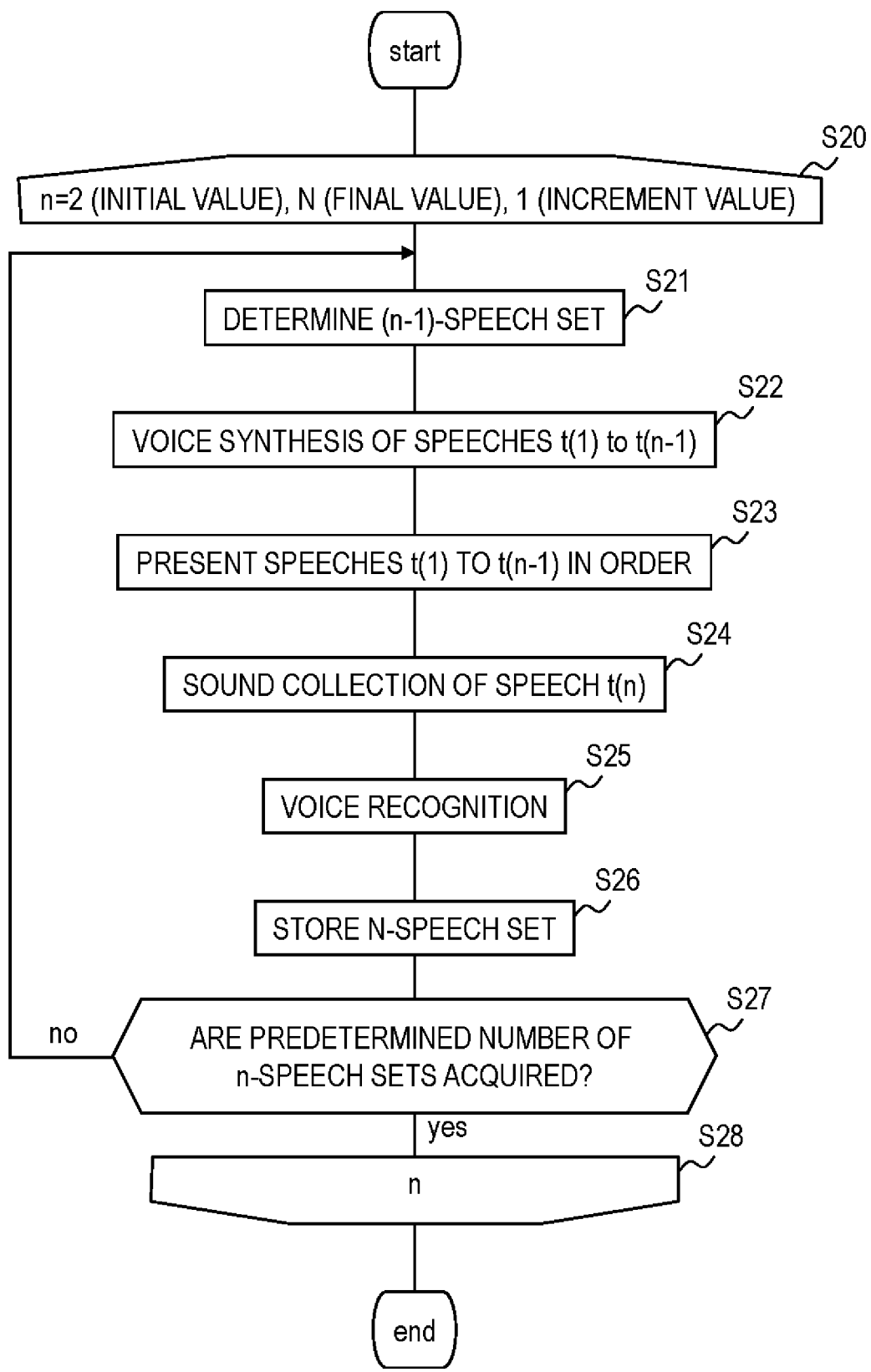
FIG. 7 is a diagram illustrating an example of a processing flow when acquiring data of a dialog system according to a second embodiment.
Figure 8:
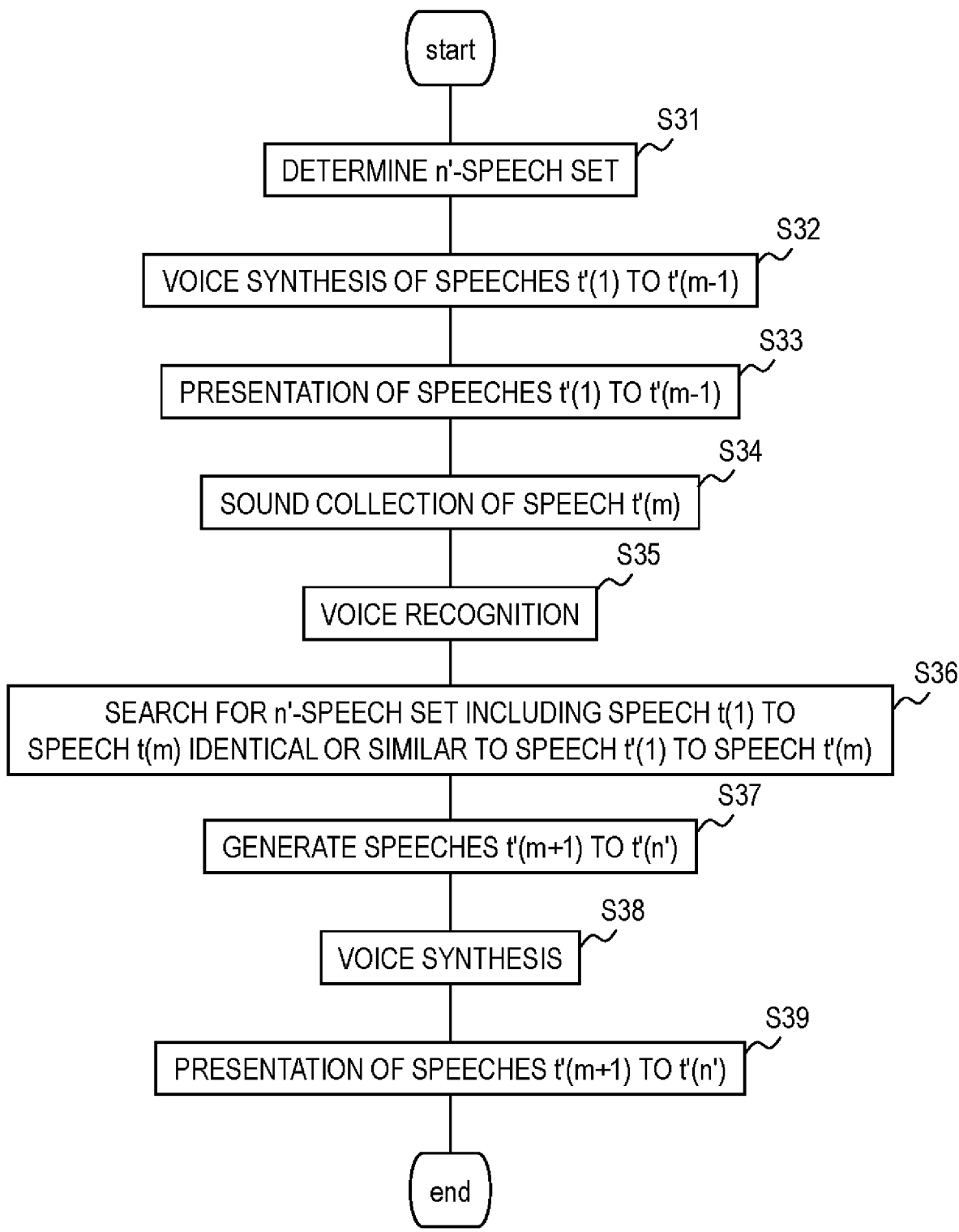
FIG. 8 is a diagram illustrating an example of a processing flow when generating a speech of the dialog system according to the second embodiment.

Description will be focused on the differences from the first embodiment. FIG. 7 illustrates processing when acquiring data and FIG. 8 illustrates a processing flow when creating a speech.

<When Acquiring Data (when Dialog System 100 is Caused to Function as Speech Acquisition System)>

When data is acquired according to the present embodiment, a speech set in which N speeches are associated with one another is acquired. N is any one of an integer equal to or greater than 3. Note that a speech set in which N speeches are associated with one another is used to generate an N-th speech made by the dialog system in response to an (N−1)-th human speech made after the first to (N−2)-th speech made by the dialog system or/and the human based on a speech set in which N speeches are associated with one another.

The storage part 130 stores a combination of (n−1) speeches (hereinafter also referred to as "(n−1)-speech set") in a certain dialog in advance. Note that n=2, 3, N. The (n−1)-speech set always includes one or more speeches of the dialog system. This is to take advantage of the tendency of a human to utter a speech in accordance with the speech level or contents of the system when the human has a dialog with the dialog system.

In the present embodiment, the (n−1)-speech set is assumed to be stored in a text format, that is, as text data. Here, "stored in advance" means that a speech is stored before data of an n-speech set which will be described later is acquired.

Figure 9:
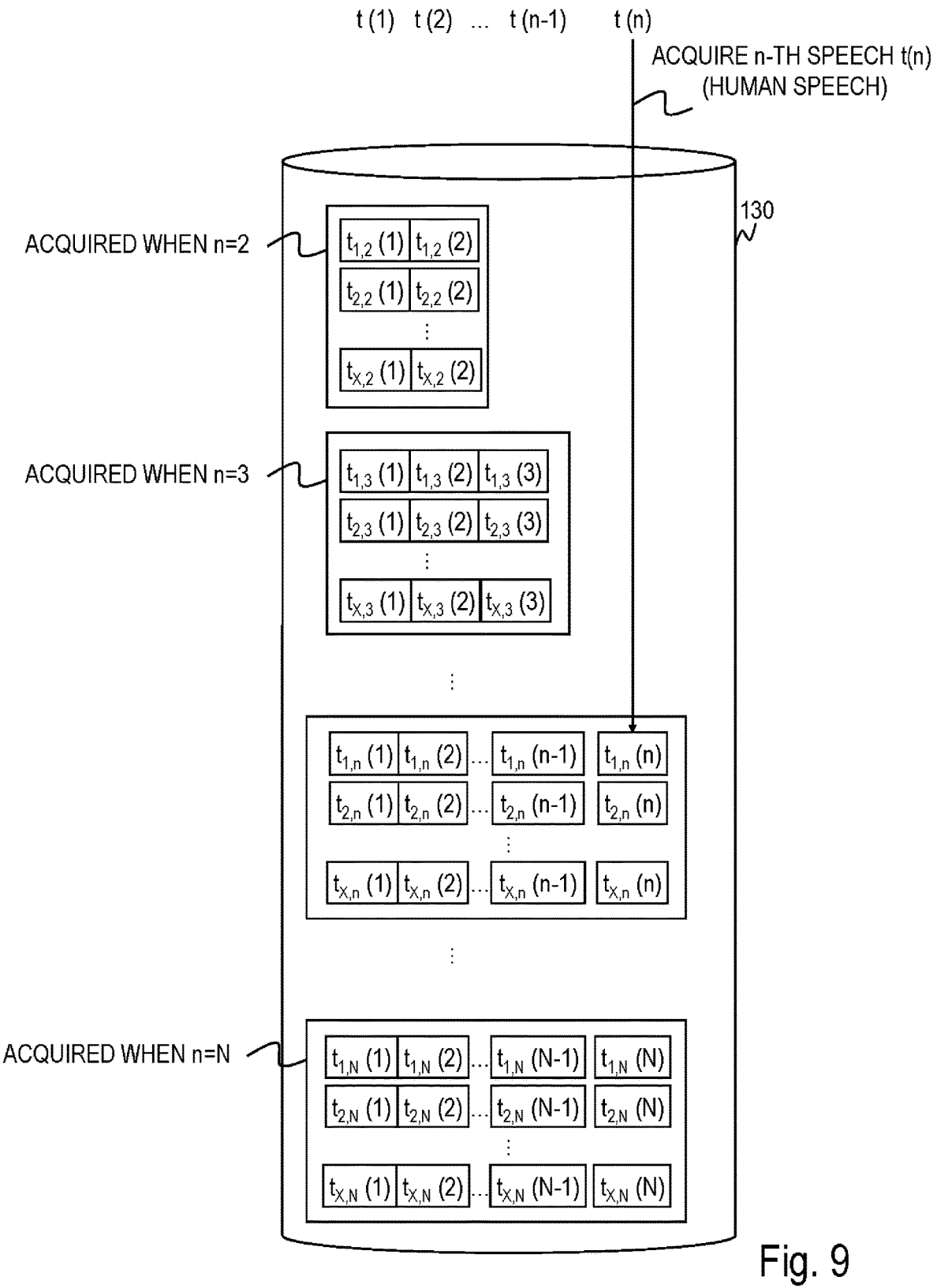
FIG. 9 is a diagram illustrating an example of data stored in a storage part when acquiring data of the dialog system according to the second embodiment.

FIG. 9 illustrates an example of data stored in the storage part 130. X (n−1)-speech sets from a first speech $t_{x,\,n-1}(1)$ to an (n−1)-th speech $t_{x,n-1}(n-1)$ are stored in the storage part 130 in advance. The storage part 130 assigns the speeches $t_{x,n-1}(1)$ to $t_{x,n-1}(n-1)$ of the (n−1)-speech set as the speeches $t_{x,\,n}(1)$ to $t_{x,\,n}(n-1)$ of the n-speech set and stores an n-speech set in which an n-th speech made by the human in response to speeches $t_{x,n-1}(1)$ to $t_{x,\,n-1}(n-1)$ sequentially made by the dialog system 100 is assigned as speech $t_{x,\,n}(n)$ of the n-speech set. Note that a subscript x is an index indicating an n-speech set, and x=1, 2, . . . , X. As in the case of the first embodiment, the speeches $t_{x,\,n-1}(1)$ to $t_{x,n-1}(n-1)$ need not always be made by the robot and may also be made by a human, but the speeches $t_{x,n-1}(1)$ to $t_{x,n-1}(n-1)$ always include one or more speeches of the dialog system.

The speech determination part 120 determines one (n−1)-speech set from among a plurality of (n−1)-speech sets stored in the storage part 130 (S21) and outputs text data $t_{x,\,n-1}(1)$ to $t_{x,\,n-1}(n-1)$ corresponding to the determined (n−1)-speech set to the voice synthesis part 110.

The voice synthesis part 110 performs voice synthesis on text data $t_{x,\,n-1}(1)$ to $t_{x,n-1}(n-1)$ corresponding to each speech included in the (n−1)-speech set (S22) and outputs synthesized voice data to the reproduction part 101-1 or the reproduction part 101-2 of the robot R1 or the robot R2.

Each reproduction part reproduces a voice corresponding to the synthesized voice data according to the speech sequence. That is, the reproduction part presents the first speech $t_{x,\,n-1}(1)$ to the (n−1)-th speech $t_{x,\,n-1}(n-1)$ in order (S23).

The sound collection part receives input of the speech $t_{x,\,n}(n)$ made by the person a after presenting the speech $t_{x,\,n-1}(n-1)$. That is, the sound collection part collects the speech voice of the speech $t_{x,\,n}(n)$ made by the person a after presenting the speech $t_{x,\,n-1}(n-1)$ (S24). The sound collection part outputs the collected voice data to the voice recognition part 140. Note that the speech $t_{x,\,n}(n)$ of the person a is collected by at least one of the sound collection parts 102-1 and 102-2. As in the case of the first embodiment, any one of the sound collection parts 102-1 and 102-2 need not be provided. A configuration without both sound collection parts 102-1 and 102-2 may also be adopted in which a microphone placed at a place different from the robots R1 and R2, for example, in the vicinity of the person a is used as the sound collection part 102.

The voice recognition part 140 performs voice recognition on the collected voice data (S25) and outputs the voice recognition result to the speech storage processing part 150 as text data of the speech $t_{x,\,n}(n)$.

The speech storage processing part 150 receives the text data of the speech $t_{x,\,n}(n)$ from the voice recognition part 140, assumes the text data of speeches $t_{x,\,n-1}(1)$, $t_{x,\,n-1}(2)$, . . . , $t_{x,\,n-1}(n-1)$ which is included in an (n−1)-speech set determined by the speech determination part 120 as text data of speeches $t_{x,\,n}(1)$, $t_{x,\,n}(2)$, . . . , $t_{x,\,n}(n-1)$ respectively and associates text data of the speeches with text data of the speech $t_{x,\,n}(n)$ inputted from the voice recognition part 140 and stores the n-speech set composed of text data of $t_{x,\,n}(1)$, $t_{x,\,n}(2)$, . . . , $t_{x,\,n}(n-1)$, $t_{x,\,n}(n)$ in the storage part 130 (S26).

The above-described processes S21 to S26 are repeated until a predetermined number of n-speech sets are acquired (S27). Note that it may be possible to acquire one n-speech set for one (n−1)-speech set or acquire two or more n-speech sets (an n-speech set with the same speeches t(1) to t(n−1) and different speech t(n)) for one (n−1)-speech set.

Furthermore, the above-described processes are executed from n=2 to n=N (S20, S28). With such a configuration, it is possible to acquire an n-speech set using an (n−1)-speech set.

<When Generating Speech (when Dialog System 100 is Caused to Function as Speech Generation System)>

The processes when generating a speech will be described using FIG. 8.

The storage part 130 stores, in advance, a predetermined number of n'-speech sets acquired by the dialog system 100 which is caused to function as a speech acquisition system, that is, n'-speech sets acquired by causing the dialog system 100 to perform the above-described operation described in <when acquiring data (when dialog system 100 is caused to function as speech acquisition system)>. However, n' is any one of an integer equal to or greater than 3 and equal to or less than N. For example, when n'=N, when the dialog system 100 is caused to function as a speech acquisition system, the storage part 130 stores a speech set (N-speech set) in which the first speech to the (N−1)-th speech presented by the dialog system 100 and the N-th speech which is a speech of the person a made after presenting the (N−1)-th speech are associated with one another. Note that in the present embodiment, it is assumed that the n'-speech set is stored in a text format, that is, as text data. Here, "stored in advance" means being stored before generation of the speech. Here, speeches included in x-th n'-speech sets of a predetermined number of n'-speech sets are assumed to be speeches $t_x(1), \ldots, t_x(n')$ respectively.

The speech determination part 120 determines one n'-speech set from among a predetermined number of n'-speech sets stored in the storage part 130 (S31). The speech determination part 120 outputs text data corresponding to the first speech to the (m−1)-th speech included in the determined n'-speech set to the voice synthesis part 110, where m is any one of an integer equal to or greater than 1 and less than n'. Here, the first speech to the (m−1)-th speech included in the n'-speech set determined by the speech determination part 120 are assumed to be t'(1), t'(m−1).

The voice synthesis part 110 performs voice synthesis on the text data corresponding to the first speech t'(1) to the (m−1)-th speech t'(m−1) outputted from the speech determination part 120 (S32) and outputs the synthesized voice data to the reproduction part 101-1 or 101-2 of the robot R1 or the robot R2.

The reproduction part 101-1 or 101-2 reproduces the voice corresponding to the synthesized voice data of the first speech t'(1) to the (m−1)-th speech t'(m−1), that is, presents the first speech t'(1) to the (m−1)-th speech t'(m−1) in order (S33).

The sound collection part receives input of the speech t'(m) made by the person b (user b who performs a dialog with the dialog system 100) after presenting the speech t'(m−1). That is, the sound collection part collects a speech voice of the speech t'(m) made by the person b after presenting the speech t'(m−1) (S34). The sound collection part outputs the collected voice data to the voice recognition part 140. Note that the speech t'(m) of the person b is collected by at least any one of the sound collection parts 102-1 and 102-2 and outputted to the voice recognition part 140. However, when m=1, the processes in S32 and S33 are omitted and input of the speech t'(m) made by the person b is received without presenting the speech t'(m−1) (S34). As in the case of the first embodiment, any one of the sound collection parts 102-1 and 102-2 may not be provided. A configuration without both sound collection parts 102-1 and 102-2 may also be adopted in which a microphone placed at a place different from the robots R1 and R2, for example, in the vicinity of the person b is used as the sound collection part 102.

The voice recognition part 140 performs voice recognition on the collected voice data (S35) and outputs the voice recognition result to the speech determination part 120 as text data of the speech t'(m).

The speech determination part 120 receives text data of the speech t'(m) and searches for an n'-speech set including a speech $t_x(1)$ to a speech $t_x(m)$ identical or similar to the speech t'(1) to the speech t'(m) respectively from among a plurality of n'-speech sets stored in the storage part 130 (S36). When there is an n'-speech set including a speech $t_x(1)$ to a speech $t_x(m)$ identical or similar to the speech t'(1) to the speech t'(m) respectively, the speech determination part 120 generates text data of a speech identical or similar to the (m+1)-th speech $t_x(m+1)$ to the n'-th speech $t_x(n')$ of the n'-speech set as text data of the speech t'(m+1) to t'(n') of the dialog system 100 (S37) and outputs the text data to the voice synthesis part 110. Note that a method similar to the method of the first embodiment can be used as a method for judging whether or not speeches are identical or similar to one another and a method for generating identical or similar speeches. Note that it has been assumed in the present embodiment that m is any one of an integer equal to or greater than 1 and less than n', but m is preferably any one of an integer equal to or greater than 2 and less than n' in order to confirm the flow of a dialog.

The voice synthesis part 110 performs voice synthesis on text data corresponding to a speech t'(m+1) to a speech t'(n') inputted from the speech determination part 120 respectively (S38), obtains synthesized voice data and outputs the synthesized voice data obtained to the reproduction part 101-1 or 101-2 of the robot R1 or R2.

The reproduction part 101-1 or 101-2 of the robot R1 or R2 reproduces voice corresponding to the synthesized voice data of the speech t'(m+1) to the speech t'(n') inputted from the voice synthesis part 110, that is, presents the speech t'(m+1) to the speech t'(n') (S39).

<Effects>

When the dialog system 100 is caused to function as a speech acquisition system that acquires data for causing the dialog system 100 to function as a speech generation system by adopting such a configuration as in the case of the first embodiment, it is possible to eliminate the need for the rule writing cost. On the other hand, when the dialog system 100 is caused to function as a speech generation system that generates a speech made by the dialog system 100 in response to a human speech, it is possible to generate a speech with less uncomfortable feeling from data acquired without defining any rules. Furthermore, when the dialog system 100 generates speeches t'(m+1) to t'(n'), the more preceding speeches t'(1) to t'(m), that is, the greater the value of m, the higher the possibility that a natural speech can be selected becomes. That is, when the value of m is increased, since the acquired human speech t'(m) is made after receiving a plurality of speeches t'(1) to t'(m−1) in the flow of a dialog between a human and the dialog system, and so when generating speeches t'(m+1) to t'(n') made by the dialog system in response to the human speech t'(m), it is possible to confirm the flow of the dialog through a plurality of speeches t'(1) to t'(m) between the human and the dialog system and generate a speech along the flow. Note that when N=n'=3 and m=2, the present embodiment has the same configuration as that of the first embodiment, and so the first embodiment can be said to be an example of the second embodiment.

Note that as in the case of the first embodiment, the second embodiment can also be implemented by being modified as the modifications 1 to 4 of the first embodiment.

<Modification 1>

When data is acquired in the second embodiment, an n-speech set is acquired using an (n−1)-speech set. A method will be described in the present modification in which an n-speech set is acquired using an (n−1)-speech set, and (n−1)-speech set, (n−2)-speech set, . . . , two-speech set are also acquired. Description will be focused on differences from the second embodiment. The present modification is different from the second embodiment in that the following process is performed after acquiring the n-speech set in S26 in FIG. 7. An example will be described below where the predetermined number is X. The speech storage processing part 150 obtains, for each of the X n-speech sets generated by the speech storage processing part 150, a two-speech set including speeches $t_{x,n}(n-1)$ and $t_{x,n}(n)$, a three-speech set including speeches $t_{x,n}(n-2)$, $t_{x,n}(n-1)$ and $t_{x,n}(n)$, . . . , an (n−1)-speech set including $t_{x,n}(2)$, $t_{x,n}(3)_n$, . . . , $t_{x,n}(n-1)$ and $t_{x,n}(n)$ from the speech $t_{x,n}(1)$ to speech $t_{x,n}(n)$, and stores the speech sets in the storage part 130.

By adopting such a configuration, it is possible to acquire more respective speech sets than in the second embodiment. Since the respective speech sets always include a speech t(n) made by the human toward the dialog system, the respective speech sets can be said to be speeches suitable to be adopted as a speech for the dialog system.

Note that not only the n-speech set but also the (n−1)-speech set, (n−2)-speech set, . . . , two-speech set are all acquired in the present modification, but if a configuration is adopted in which at least one of the (n−1)-speech set, (n−2)-speech set, . . . , two-speech set is acquired, more speeches than in the second embodiment can be acquired. Note that the n-speech set is always acquired in the present modification, but the n-speech set need not always be acquired. That is, in the present modification, the speech storage processing part 150 acquires a set with any number of speeches of two or more and n or fewer consecutive speeches including the n-th speech for each of X n-speech sets as any one of two-speech set to n-speech set, and stores those speech sets in the storage part 130. More specifically, when p is assumed to be an integer equal to or greater than 1 and equal to or less than P, and $m_p$ is assumed to be any one of an integer equal to or greater than 2 and equal to or less than n for each p, the speech storage processing part 150 acquires a speech $t(n-m_p+1)$ to a speech $t(n)$ associated with one another for each $m_p$ as a speech set in which $m_p$ speeches are associated with one another, that is, an ($m_p$)-speech set and stores the ($m_p$)-speech set in the storage part 130.

For example, by combining the first embodiment and the present modification, it is possible to acquire a three-speech set and also acquire a two-speech set. A process is performed for storing the speech t(1), the speech t(2) and the speech t(3) associated with one another as a three-speech set in the storage part 130 and storing the speech t(2) and the speech t(3) associated with each other as a two-speech set in the storage part 130.

<Modification 2>

Description will be focused on differences from the second embodiment.

When a speech is generated in the second embodiment, the speech determination part 120 searches for an n'-speech set including a speech $t_x(1)$ to a speech $t_x(m)$ identical or similar to a speech t'(1) to a speech t'(m) respectively from among a predetermined number of n'-speech sets stored in the storage part 130. When there are identical or similar n'-speech sets, the speech determination part 120 generates a speech identical or similar to the (m+1)-th speech $t_x(m+1)$ to the n'-th speech $t_x(n')$ of the n'-speech set as speeches t'(m+1) to t(n') of the dialog system 100.

In the present modification, the speech determination part 120 generates, as a speech t'(m+1) of the dialog system after the speech t'(m), a speech identical or similar to at least a speech $t_x(n'-j+1)$ of speeches following m consecutive speech $t_x(n'-m+1-j)$ to speech $t_x(n'-j)$ of the n'-speech set in which m consecutive speech $t_x(n'-m+1-j)$ to speech $t_x(n'-j)$ included in the n'-speech set among a predetermined number of n'-speech sets stored in the storage part 130 are identical or similar to the first speech t'(1) to the m-th speech t'(m) made between the person b and the dialog system. Here, j is assumed to be any one of an integer equal to or greater than 1 and equal to or less than n'−m.

For example, when m=2 and n'=5, a specific example of the process performed by the speech determination part 120 when generating a speech will be described using FIG. 10. In the present specific example, suppose X five-speech sets are stored in the storage part 130. In the present specific example, the speech determination part 120 searches for two consecutive speech $t_x(4-j)$ and speech $t_x(5-j)$ of the speech set identical or similar to the speech t'(1) and the speech t'(2) respectively which are speeches included in the speech t'(1) and the speech t'(2) made between the person b and the dialog system, from among X five-speech sets stored in the storage part 130, where j is an integer equal to or greater than 1 and equal to or less than 3.

Figure 10:
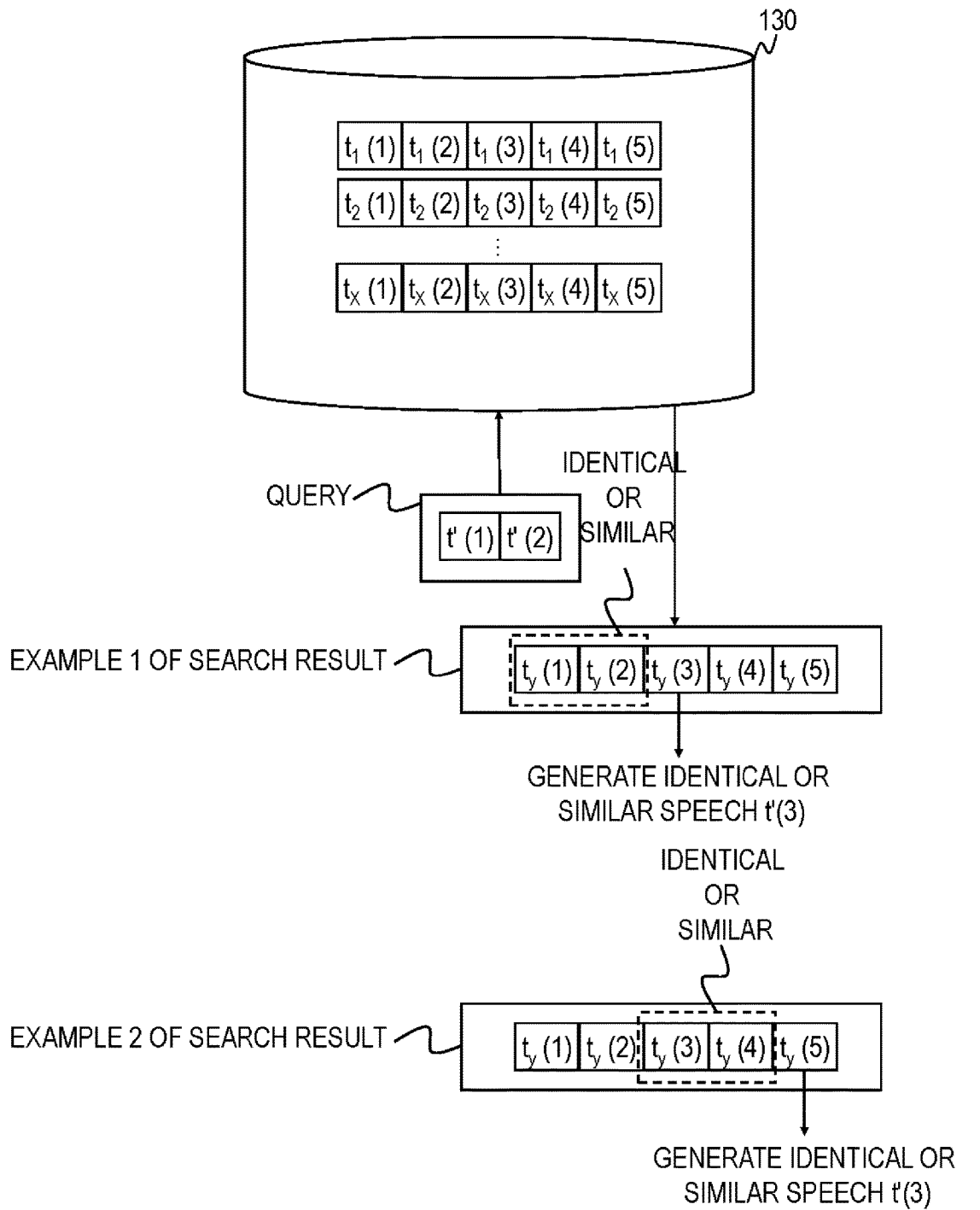
FIG. 10 is a diagram for describing a process when generating a speech of a dialog system according to modification 2 of the second embodiment.

For example, as shown in example 1 of the search result in FIG. 10, when the speeches t'(1) and t'(2) are identical or similar to $t_y(1)$ and $t_y(2)$ which is one set of a five-speech set $t_y(1)$, $t_y(2)$, $t_y(3)$, $t_y(4)$ and $t_y(5)$ stored in the storage part 130, the speech determination part 120 generates a speech identical or similar to at least the speech $t_y(3)$ of the speeches following the speech $t_y(2)$ as a speech t'(3) of the dialog system after the speech t'(2). Note that the speech identical or similar to the speech $t_y(4)$ and speech $t_y(5)$ may or may not be generated as speeches of the dialog system speech. At this time, j=3.

Alternatively, as shown in example 2 of the search result in FIG. 10, when the speeches t'(1) and t'(2) are identical or similar to $t_y(3)$ and $t_y(4)$ which is one set of a five-speech set $t_y(1)$, $t_y(2)$, $t_y(3)$, $t_y(4)$ and $t_y(5)$ stored in the storage part 130, the speech determination part 120 generates a speech identical or similar to at least the speech $t_y(5)$ following the speech $t_y(4)$ as a speech t'(3) of the dialog system after the speech t'(2). At this time, j=1. Note that speeches $t_y(1)$ and $t_y(2)$ are not used to generate any speech in this case.

With such a configuration, it is possible to obtain effects similar to those of the second embodiment and acquire data more flexibly from the data stored in the storage part 130. When j=n'−m, and when speeches identical or similar to the (m+1)-th speech t(m+1) (=t(n'−j+1)) to the n'-th speech t(n') of the n'-speech set are generated as speeches t'(m+1) to t'(n') of the dialog system 100, modification 2 becomes identical to the second embodiment, and so the second embodiment can be said to be an example of modification 2.

Note that the present modification and modification 1 can be combined.

<Modification 3>

Description will be focused on the differences from modification 2 of the second embodiment.

In modification 2, the speech determination part 120 generates, as a speech t'(m+1) of the dialog system after the speech t'(m), a speech identical or similar to at least a speech $t_x(n'-j+1)$ of speeches following m consecutive speech $t_x(n'-m+1-j)$ to speech $t_x(n'-j)$ of the n'-speech set in which m consecutive speech $t_x(n'-m+1-j)$ to speech $t_x(n'-j)$ included in the n'-speech set among a predetermined number of n'-speech sets stored in the storage part 130 are identical or similar to the first speech t'(1) to the m-th speech t'(m) made between the person b and the dialog system. Here, j is assumed to be any one of an integer equal to or greater than 1 and equal to or less than n'–m.

In present modification 2, the speech determination part 120 generates, as a speech t'(m+1) of the dialog system after the speech t'(m), a speech identical or similar to at least one speech among speeches following m consecutive speeches of the speech set in which m consecutive speeches included in any one of a predetermined number of n'-speech sets, a predetermined number of n'–1-speech sets, . . . , a predetermined number of three-speech sets stored in the storage part 130 are identical or similar to the first speech t'(1) to the m-th speech t'(m) made between the person b and the dialog system. Here, j is assumed to be any one of an integer equal to or greater than 1 and equal to or less than n'–m.

For example, when m=2 and n'=5, a specific example of the speech generating process executed by the speech determination part 120 will be described using FIG. 11. In the present specific example, suppose that X5 five-speech sets, X4 four-speech sets and X3 three-speech sets are stored in the storage part 130. Note that each of X5, X4 and X3 is any one of an integer equal to or greater than 1. In the present specific example, the speech determination part 120 searches for two consecutive speeches of a speech set identical or similar to the speech t'(1) and the speech t'(2) which are speeches included in the speech t'(1) to the speech t'(2) made between the person b and the dialog system from among the X5 five-speech sets, X4 four-speech sets and X3 three-speech sets stored in the storage part 130. That is, the speech determination part 120 searches, from the five-speech sets assuming that j is an integer equal to or greater than 1 and equal to or less than 3, for speech $t_{x,5}(5-j)$ from speech $t_{x,5}(4-j)$ identical or similar to the speech t'(1) to the speech t'(2) respectively, searches, from the four-speech sets assuming that j is an integer equal to or greater than 1 and equal to or less than 2, for a speech $t_{x,4}(4-j)$ from the speech $t_{x,4}(3-j)$ identical or similar to the speech t'(1) to the speech t'(2) respectively and searches, from the three-speech sets, for a speech $t_{x,3}(2)$ from a speech $t_{x,3}(1)$ identical or similar to the speech t'(1) to the speech t'(2) respectively.

Figure 11:
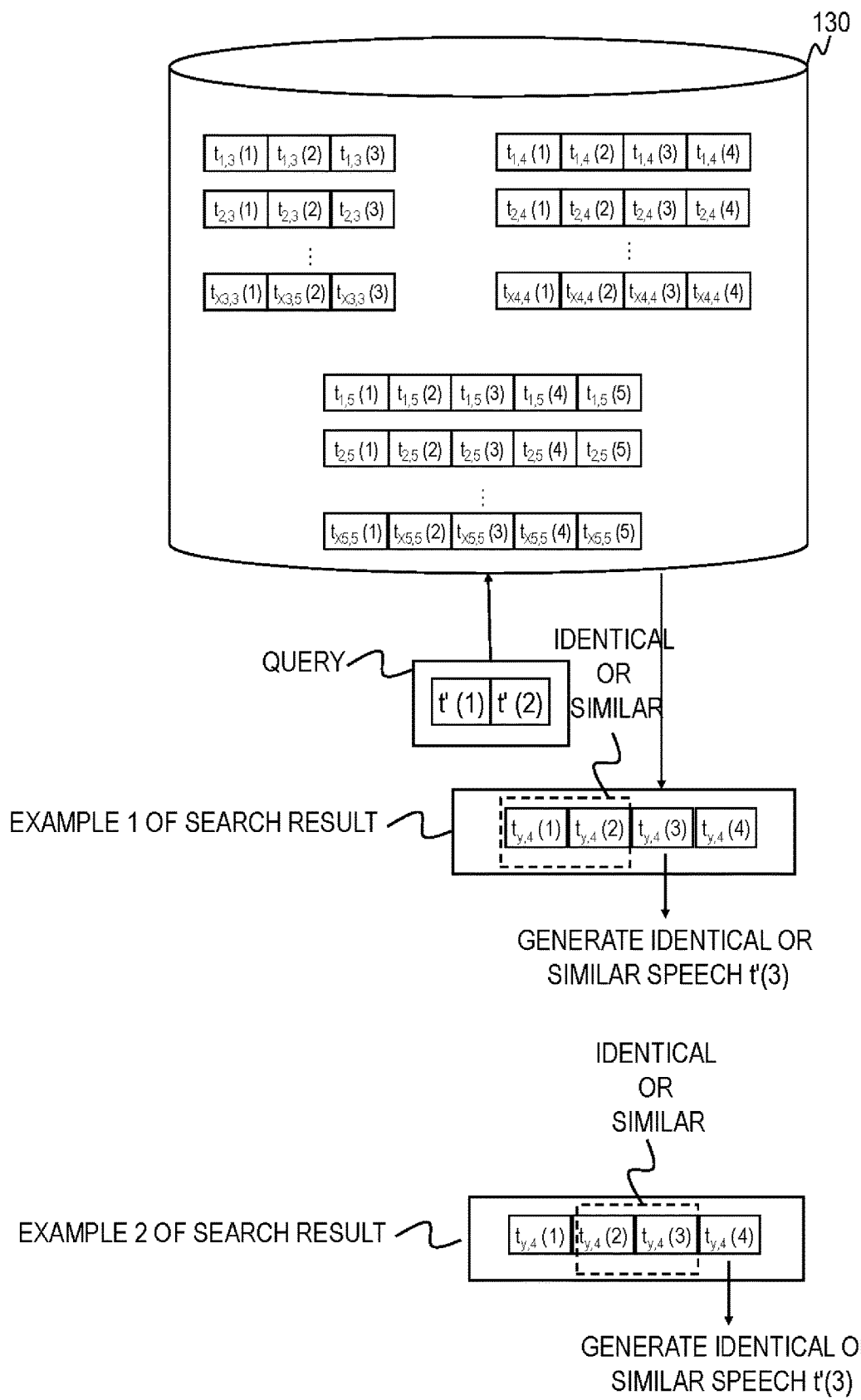
FIG. 11 is a diagram for describing a process when generating a speech of a dialog system according to modification 3 of the second embodiment.

As shown in example 1 of the search result in FIG. 11, when the speeches t'(1) and t'(2) are identical or similar to $t_{y,4}(1)$ and $t_{y,4}(2)$ of speech set $t_{y,4}(1)$, $t_{y,4}(2)$, $t_{y,4}(3)$, $t_{y,4}(4)$ which is one of four-speech sets stored in the storage part 130, the speech determination part 120 generates at least the speech $t_{y,4}(3)$ among speeches following the speech $t_{y,4}(2)$ as the speech t'(3) of the dialog system after the speech t'(2). Note that the speech $t_{y,4}(4)$ may or may not be generated as a speech of the dialog system.

Alternatively, as shown in example 2 of the search result in FIG. 11, when the speeches t'(1) and t'(2) are identical or similar to $t_{y,4}(2)$ and $t_{y,4}(3)$ of speech set $t_{y,4}(1)$, $t_{y,4}(2)$, $t_{y,4}(3)$, $t_{y,4}(4)$ which is one of four-speech sets stored in the storage part 130, the speech determination part 120 generates the speech $t_{y,4}(4)$ following the speech $t_{y,4}(3)$ as the speech t'(3) of the dialog system after the speech t'(2). Note that the speech $t_{y,4}(1)$ is not used to generate a speech in this case.

By adopting such a configuration, it is possible to obtain effects similar to those of the second embodiment and modification 2 of the second embodiment and more flexibly acquire data from the data stored in the storage part 130.

Note that the present modification may be combined with modification 1.

<Modification 4>

Although the dialog system performs a speech $t_{x,n-1}(1)$ to a speech $t_{x,n-1}(n-1)$ when acquiring data in the present embodiment, a mode will be described in the present modification where human speeches are included in the speech $t_{x,n-1}(1)$ to the speech $t_{x,n-1}(n-1)$. For example, a k-th speech is assigned as a human speech $t_h(k)$. In that case, in the dialog system 100, the voice recognition part 140 performs voice recognition on voice data obtained by the sound collection part by collecting a speech voice of the human speech $t_h(k)$ to obtain text data of the speech $t_h(k)$, and the speech storage processing part 150 judges whether or not the human speech $t_h(k)$ is identical or similar to a k-th speech $t_{x,n-1}(k)$ of the (n–1)-speech set. When the human speech $t_h(k)$ is identical or similar to the speech $t_{x,n-1}(k)$, then, the dialog system 100 performs (k+1)-th speech $t_{x,n-1}(k+1)$ to (N–1)-th speech $t_{x,n-1}(n-1)$, and the sound collection part collects a speech voice of the speech $t_{x,n-1}(n)$ made by the person a after presenting the speech $t_{x,n-1}(n-1)$. The voice recognition part 140 performs voice recognition on the voice data obtained and obtains text data of the speech $t_{x,n}(k)$. The speech storage processing part 150 assigns the speeches $t_{x,n-1}(1)$ to $t_{x,n-1}(n-1)$ as speeches $t_{x,n}(1)$ to $t_{x,n}(n-1)$ to be associated with text data of the speech $t_{x,n}(n)$ and stores the speeches in the storage part 130. Note that human speeches may also be included in (k+1)-th to (N–1)-th speeches made by the dialog system using the same method. However, one or more speeches of the dialog system must be included in the speech $t_{x,n-1}(1)$ to the speech $t_{x,n-1}(n-1)$. This is to utilize the tendency that a human performs a speech in accordance with the speech level and contents of the dialog system when performing a dialog with the dialog system. Note that this modification can be combined with modification 1.

In the present embodiment, when a speech is generated, the dialog system utters an (m+1)-th speech t(m+1) to an n'-th speech t(n'). In the present modification, a mode in which human speeches are included in the speech t(m+1) to the speech t(n') will be described. For example, the k-th speech is assumed to be a human speech $t_h(k)$. At this time, k is equal to or greater than m+1 and less than n' and a process similar to the process executed on the above-described speech t'(m) may be executed. Note that this modification may be combined with modification 2 or modification 3.

<Other Modifications>

The present invention is not limited to the above-described embodiments and modifications. For example, the above-described various processes may not only be executed in time-series order according to the description, but also be executed in parallel or individually according to a processing capacity of the apparatus that executes the processes or as required. In addition, the present invention can be changed as appropriate without departing from the spirit and scope of the present invention.

<Program and Recording Medium>

The various processing functions of the respective apparatuses described in the above-described embodiments and modifications may be implemented by a computer. In that case, processing contents of the functions that should be possessed by the respective apparatuses are described by a program. Furthermore, the program is executed by a computer and the various processing functions in the respective apparatuses may be implemented on a computer.

The program that describes the processing contents can be recorded in a computer-readable recording medium. Examples of the computer-readable recording medium include a magnetic recording apparatus, an optical disk, a magneto-optical recording medium, a semiconductor memory or any medium.

This program is circulated through sales, transfer or rent of a portable recording medium such as DVD, CD-ROM that records the program. The program may also be circulated by storing the program in a storage apparatus of a server computer, and transferring the program from the server computer to another computer via a network.

The computer that executes such a program temporally stores a program recorded in a portable storage medium or a program transferred from the server computer in the own storage part. At the time of execution of a process, this computer reads the program stored in the own storage part and executes the process according to the read program. As another embodiment of the program, the computer may read the program directly from a portable recording medium and execute the process according to the program. Furthermore, every time the program is transferred to the computer from the server computer, processes according to the received program may be executed successively. The above-described processes may be executed by a so-called ASP (Application Service Provider) type service in which without the server computer transferring the program to the computer, the processing function is implemented only by instructing execution and acquiring the result. Note that the program includes a semi-program which is information used for processing by a computer (data which is not a direct instruction on the computer but has a characteristic of defining processes of the computer).

Although each apparatus is configured by executing a predetermined program on the computer, at least some of these processing contents may be implemented by hardware.

What is claimed is:

1. An acquisition method executed by an acquisition system to acquire a three-speech set in which three speeches, each of which forms a portion of a dialog that includes a plurality of speakers, are associated with one another used to generate a second speech made by a dialog system in response to a human speech made by a human speaker in response to a first speech made by the dialog system based on a three-speech set recorded in advance in which three speeches are associated with one another, a storage part of the acquisition system storing two-speech sets in advance, each of two-speech sets having two speeches which are associated with each other, the method comprising:
    a presentation step of presenting in order, a speech $t(1)$ and a speech $t(2)$ which are two consecutive speeches, each of which forms a portion of a dialog that includes a plurality of speakers, included in a certain two-speech set stored in advance in the storage part of the acquisition system;
    a speech receiving step of receiving input of a third speech $t(3)$ which is a human speech made by a human speaker after presenting the speech $t(2)$; and
    a storing step of storing the speech $t(1)$ and the speech $t(2)$ recorded in advance and the speech $t(3)$ associated with one another as a three-speech set in which three speeches are associated with one another in the storage part of the acquisition system, wherein
    the acquisition system includes a first agent and a second agent different from the first agent, the first agent and the second agent being two different virtual non-human synthesized speakers, and the speech $t(1)$ is presented by the first agent and the speech $t(2)$ is presented by the second agent, and
    the speech $t(2)$ is a portion of dialog that responds directly to the speech $t(1)$.

2. The acquisition method according to claim 1, further comprising a second storing step of storing the speech $t(2)$ associated with the speech $t(3)$ in the storage part of the acquisition system as a two-speech set in which two speeches are associated with each other.

3. An acquisition method executed by an acquisition system to acquire a N-speech set in which N speeches, each of which forms a portion of a dialog that includes a plurality of speakers, are associated with one another where N is a maximum value of the number of speeches associated with a speech and assumed to be any one of an integer equal to or greater than 3, used to generate an N-th speech made by a dialog system in response to an (N−1)-th human speech made by a human speaker after first to (N−2)-th speeches made by the dialog system or/and a human based on a N-speech set recorded in advance in which N speeches are associated with one another, a storage part of the acquisition system storing a (N−1)-speech set in advance including N−1 speeches associated with one another, the acquisition method comprising:
    a presentation step of presenting in order, a speech $t(1)$ to a speech $t(N-1)$ which are N−1 consecutive speeches, each of which forms a portion of a dialog that includes a plurality of speakers, included in a certain (N−1)-speech set stored in advance in the storage part of the acquisition system;
    a speech receiving step of receiving input of an N-th speech $t(N)$ which is a human speech after presenting the speech $t(N-1)$ which is an (N−1)-th speech; and
    a storing step of storing in the storage part of the acquisition system a speech $t(N-m_p+1)$ to the speech $t(N-1)$ recorded in advance and the speech $t(N)$ associated with one another for each $m_p$ as a $m_p$-speech set in which $m_p$ speeches are associated with one another, where P represents the total number of speech sets that are associated with speech $t(N)$, p is an index indicating a speech set that is associated with speech $t(N)$ and represents each integer between 1 and P inclusive and $m_p$ is associated with p, is the number of speeches included in the p-th speech set associated with speech $t(N)$ and is an integer equal to or greater than 2 and equal to or less than N, wherein
    the acquisition system includes a first agent and a second agent different from the first agent, the first agent and the second agent being two different virtual non-human synthesized speakers, and the speech $t(N-2)$ is presented by the first agent and the speech $t(N-1)$ is presented by the second agent, and
    the speech $t(N-1)$ is a speech that responds directly to the speech $t(N-2)$.

4. The acquisition method according to claim 3, wherein the storing step stores the $m_p$-speech set where at least $m_p$=N.

5. A generation method for a generation system to generate a speech made by a dialog system in response to a human speech made by a human speaker, a storage part of the dialog system storing a speech set in advance in which a first speech presented by an acquisition system, a second speech presented by the acquisition system and a third speech which is a speech of a person a made after presenting the second speech are associated with one another, each speech forming a portion of a dialog that includes a plurality of speakers, the generation method comprising:

a presentation step of presenting a speech t'(1) stored in advance in the storage part of the dialog system;

a speech receiving step of receiving input of a second speech t'(2) which is a speech of a human person b after presenting the speech t'(1); and a generation step of generating a third speech of a speech set in which a first speech is identical or similar to the speech t'(1) and a second speech is identical or similar to the speech t'(2) of the speech set stored in advance in the storage part of the dialog system as a speech of the dialog system after the speech t'(2), wherein the acquisition system includes a first agent and a second agent different from the first agent, the first agent and the second agent being two different virtual non-human synthesized speakers, and the first speech is presented by the first agent and the second speech is presented by the second agent, and the second speech is a speech that responds directly to first speech.

6. A generation method for a generation system to generate a speech made by a dialog system in response to a human speech made by a human, a storage part of the dialog system storing a speech set in advance in which a first speech to an (N−1)-th speech where N is assumed to be any one of an integer equal to or greater than 3, made between a person a and an acquisition system and an N-th speech which is a speech of the person a made after the (N−1)-th speech are associated with one another, each speech forming a portion of a dialog that includes a plurality of speakers, the generation method comprising:

a speech receiving step of receiving input of an m-th speech t'(m) which is a speech of a human person b where m is assumed to be any one of an integer equal to or greater than 2 and less than N; and a generation step of generating at least a speech t(N−j+1) included in speeches following an m consecutive speech t(N−m+1−j) to speech t(N−j) included in a speech set stored in advance in the storage part of the dialog system when the m consecutive speech t(N−m+1−j) to speech t(N−j) are identical or similar to a first speech t'(1) to an m-th speech t'(m) made between the person b and the dialog system, as a speech of the dialog system after the speech t'(m), where N is the number of speeches included in speech sets stored in the storage part, m is the number of speeches used for searching, and j is a number to identify a starting point for the search and is assumed to be any one of an integer equal to or greater than 1 and equal to or less than N−m, wherein the acquisition system includes a first agent and a second agent different from the first agent, the first agent and the second agent being two different virtual non-human synthesized speakers, and the (N−2)-th speech is presented by the first agent and the (N−1)-th speech is presented by the second agent, and the (N−1)-th speech is a speech that responds directly to (N−2)-th speech.

7. An acquisition system that acquires a three-speech set in which three speeches are associated with one another, each of which forms a portion of a dialog that includes a plurality of speakers, used to generate a second speech made by a dialog system in response to a human speech made by a human speaker in response to a first speech made by the dialog system based on a three-speech set recorded in advance in which three speeches are associated with one another, the acquisition system comprising:

a storage part that stores two-speech sets in advance, each of two-speech sets having two speeches, each of which forms a portion of a dialog that includes a plurality of speakers, which are associated with each other;

a presentation part that presents in order, a speech t(1) and a speech t(2) which are two consecutive speeches included in a certain two-speech set stored in advance in the storage part; and a speech receiving part that receives input of a third speech t(3) which is a human speech made by a human speaker after presenting the speech t(2), wherein the storage part stores the speech t(1) and the speech t(2) recorded in advance and the speech t(3) associated with one another as a three-speech set in which three speeches are associated with one another, wherein the acquisition system includes a first agent and a second agent different from the first agent, the first agent and the second agent being two different virtual non-human synthesized speakers, and the speech t(1) is presented by the first agent and the speech t(2) is presented by the second agent, and the speech t(2) is a portion of dialog that responds directly to the speech t(1).

8. An acquisition system to acquire a N-speech set in which N speeches, each of which forms a portion of a dialog that includes a plurality of speakers, are associated with one another where N is a maximum value of the number of speeches associated with a speech and assumed to be any one of an integer equal to or greater than 3, used to generate an N-th speech, made by a dialog system in response to an (N−1)-th human speech made by a human speaker after first to (N−2)-th speeches made by the dialog system or/and a human based on a N-speech set recorded in advance in which N speeches are associated with one another, the acquisition system comprising:

a storage part that stores a (N−1)-speech set in advance in which N−1 speeches are associated with one another;

a presentation part that presents in order, a speech t(1) to a speech t(N−1) which are N−1 consecutive speeches, each of which forms a portion of a dialog that includes a plurality of speakers, included in a certain (N−1)-speech set stored in advance in the storage part of the acquisition system; and a speech receiving part that receives input of an N-th speech t(N) which is a human speech after presenting the speech t(N−1) which is an (N−1)-th speech, wherein a speech t(N−$m_p$+1) to the speech t(N−1) recorded in advance and the speech t(N) associated with one another are stored in the storage part for each $m_p$ as a $m_p$-speech set in which $m_p$ speeches are associated with one another, where P represents the total number of speech sets that are associated with speech t(N), p is an index indicating a speech set that is associated with speech t(N) and represents each integer between 1 and P inclusive and $m_p$ is associated with p, is the number of speeches included in the p-th speech set associated with speech t(N) and is an integer equal to or greater than 2 and equal to or less than N, wherein the acquisition system includes a first agent and a second agent different from the first agent, the first agent and the second agent being two different virtual non-human synthesized speakers, and the speech t(N−2) is presented by the first agent and the speech t(N−1) is presented by the second agent, and the speech t(N−1) is a speech that responds directly to the speech t(N−2).

9. A generation system that generates a speech made by a dialog system in response to a human speech made by a human speaker, the generation system comprising:
   a storage part that stores a speech set in advance in which a first speech presented by an acquisition system, a second speech presented by the acquisition system and a third speech which is a speech of a person a made after presenting the second speech are associated with one another, each speech forming a portion of a dialog that includes a plurality of speakers;
   a presentation part that presents a speech t'(1) stored in advance in the storage part of the dialog system;
   a speech receiving part that receives input of a second speech t'(2) which is a speech of a human person b after presenting the speech t'(1); and
   a generation part that generates a third speech of a speech set in which a first speech is identical or similar to the speech t'(1) and a second speech is identical or similar to the speech t'(2) of the speech set stored in advance in the storage part of the dialog system as a speech of the dialog system after the speech t'(2), wherein
   the acquisition system includes a first agent and a second agent different from the first agent, the first agent and the second agent being two different virtual non-human synthesized speakers, and the first speech is presented by the first agent and the second speech is presented by the second agent, and
   the second speech is a speech that responds directly to first speech.

10. A generation system that generates a speech made by a dialog system in response to a human speech made by a human, the generation system comprising:
    a storage part that stores a speech set in advance in which a first speech to an (N−1)-th speech made between a person a and an acquisition system and an N-th speech which is a speech of a person a made after the (N−1)-th speech are associated with one another, each speech forming a portion of a dialog that includes a plurality of speakers, where N is assumed to be any one of an integer equal to or greater than 3;
    a speech receiving part that receives input of an m-th speech t'(m) which is a speech of a human person b where m is assumed to be any one of an integer equal to or greater than 2 and less than N; and
    a generation part that generates at least a speech t(N−j+1) included in speeches following an m consecutive speech t(N−m+1−j) to speech t(N−j) included in a speech set stored in advance in the storage part of the dialog system when the m consecutive speech t(N−m+1−j) to speech t(N−j) are identical or similar to a first speech t'(1) to an m-th speech t'(m) made between the person b and the dialog system, as a speech of the dialog system after the speech t'(m), where N is the number of speeches included in speech sets stored in the storage part, m is the number of speeches used for searching, and j is a number to identify a starting point for the search and is assumed to be any one of an integer equal to or greater than 1 and equal to or less than N−m, wherein
    the acquisition system includes a first agent and a second agent different from the first agent, the first agent and the second agent being two different virtual non-human synthesized speakers, and the (N−2)-th speech is presented by the first agent and the (N−1)-th speech is presented by the second agent, and the (N−1)-th speech is a speech that responds directly to (N−2)-th speech.

11. A non-transitory computer-readable recording medium that records a program for causing a computer to function as the acquisition system according to claim 7 or 8.

12. A non-transitory computer-readable recording medium that records a program for causing a computer to function as the generation system according to claim 9 or 10.

* * * * *